US008216969B2

(12) United States Patent
Lombardi

(10) Patent No.: US 8,216,969 B2
(45) Date of Patent: *Jul. 10, 2012

(54) PATHOGEN-RESISTANT FABRICS

(76) Inventor: John L. Lombardi, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/075,051

(22) Filed: Mar. 29, 2011

(65) Prior Publication Data
US 2011/0250424 A1 Oct. 13, 2011

Related U.S. Application Data

(63) Continuation-in-part of application No. 11/894,374, filed on Aug. 20, 2007, now Pat. No. 7,915,197.

(60) Provisional application No. 60/950,323, filed on Jul. 17, 2007.

(51) Int. Cl.
*B01J 33/00* (2006.01)
*B01J 37/34* (2006.01)
*B01J 21/00* (2006.01)
*B01J 23/00* (2006.01)
*B01J 25/00* (2006.01)
*B01J 29/00* (2006.01)
*C01B 31/08* (2006.01)

(52) U.S. Cl. ............... 502/438; 502/1; 502/2; 502/5; 502/100

(58) Field of Classification Search ............. 502/1, 2, 502/5, 100, 438
See application file for complete search history.

(56) References Cited

U.S. PATENT DOCUMENTS
7,915,197 B2 * 3/2011 Lombardi .............. 502/437
* cited by examiner

*Primary Examiner* — James McDonough
(74) *Attorney, Agent, or Firm* — Dale F. Regelman; Quarles & Brady LLP

(57) ABSTRACT

A pathogen-resistant fabric comprising one or more photocatalysts capable of generating singlet oxygen from ambient air. The pathogen-resistant fabric may optionally include one or more singlet oxygen traps.

5 Claims, 27 Drawing Sheets

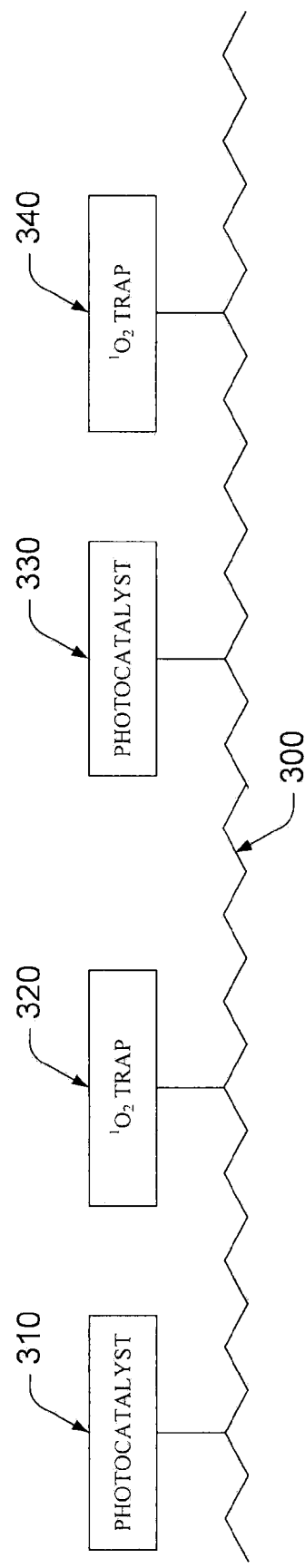

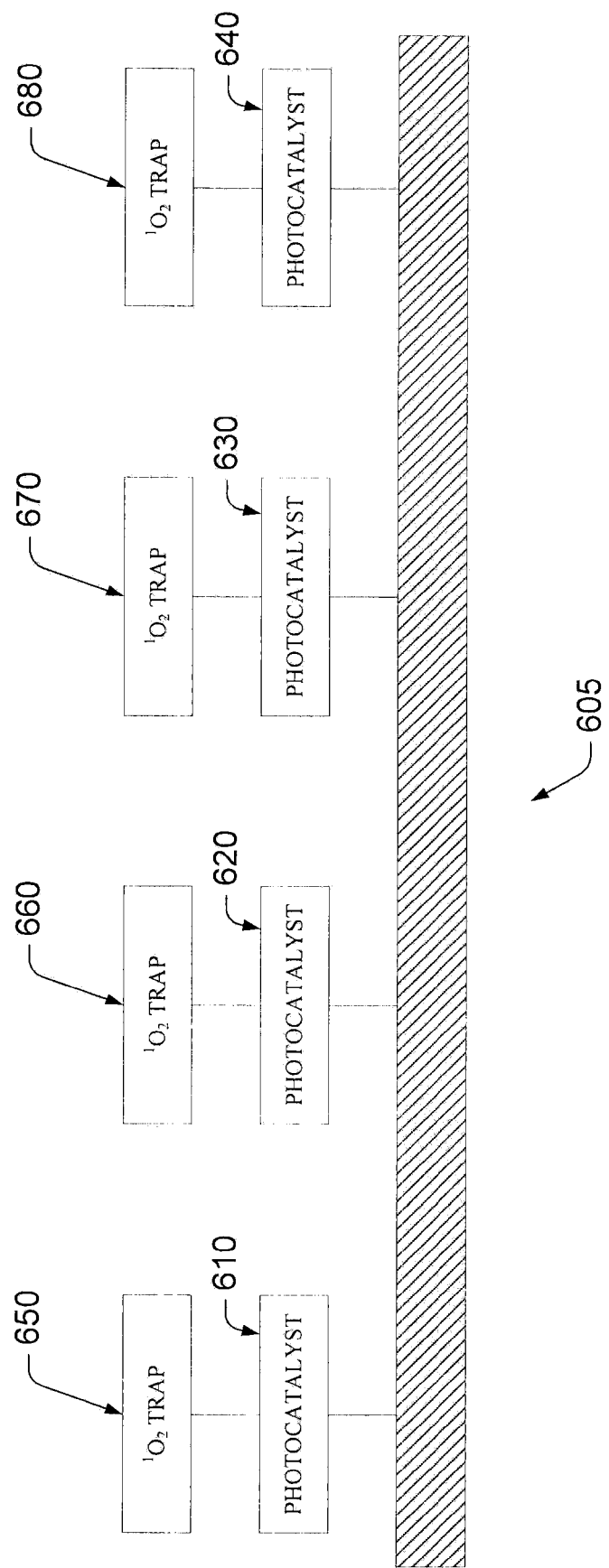

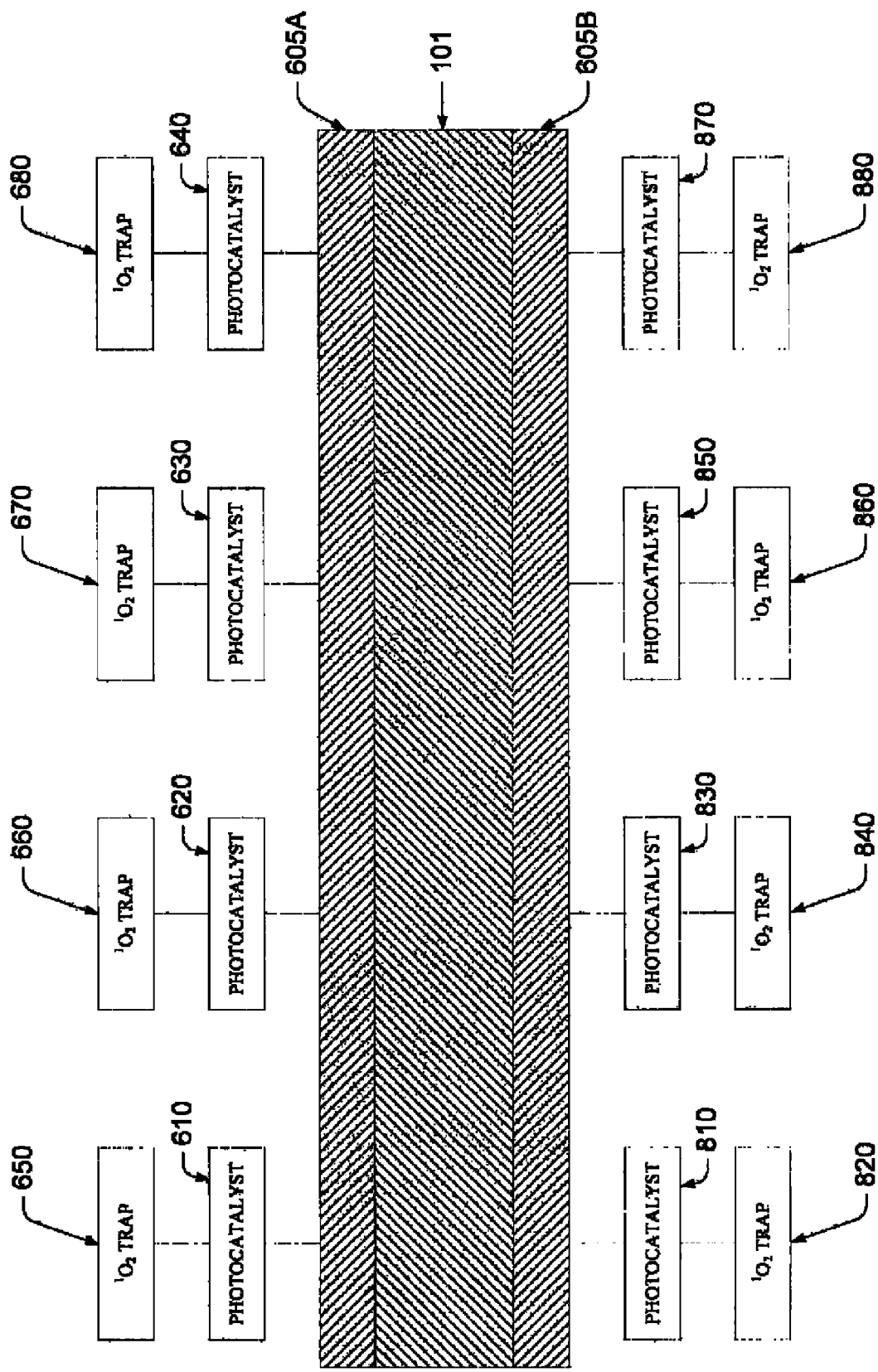

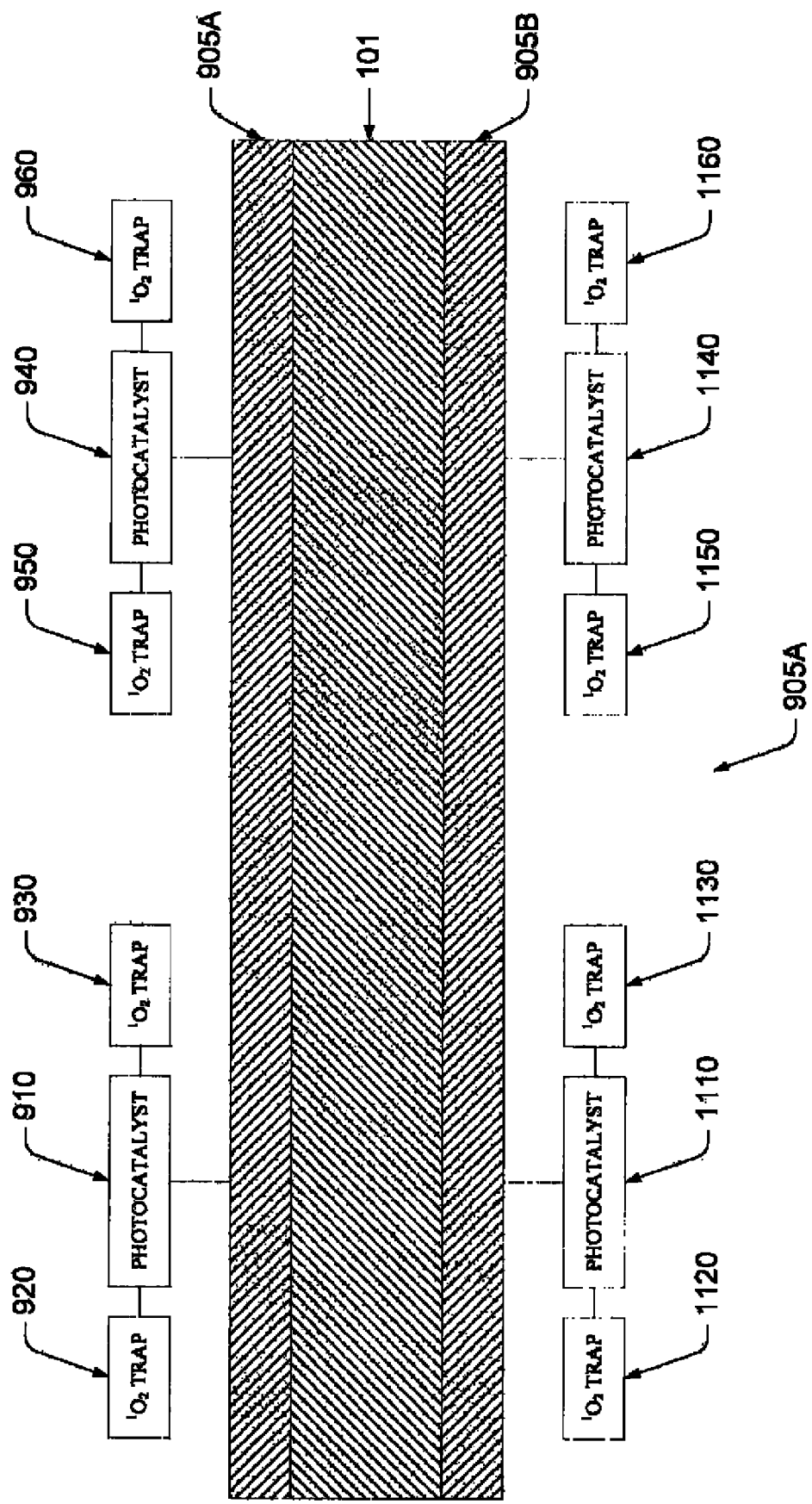

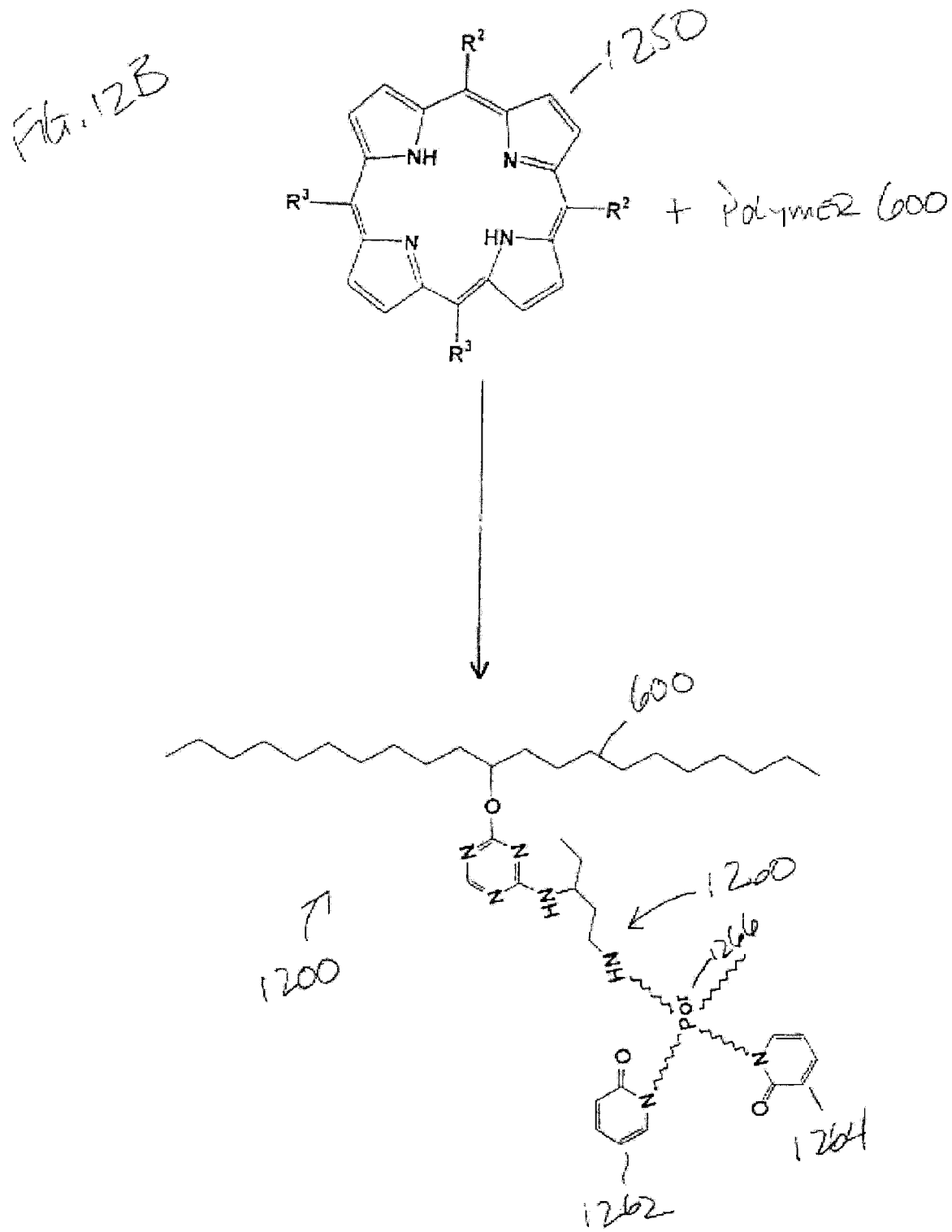

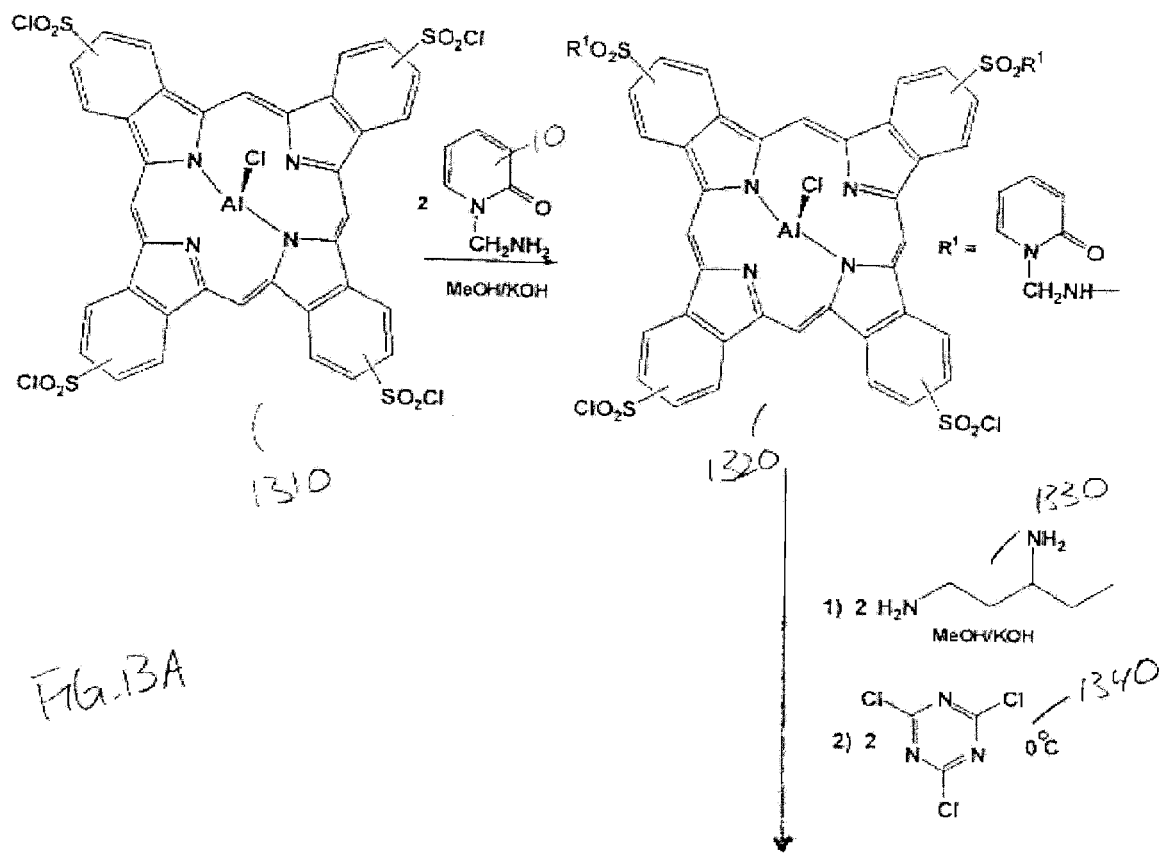
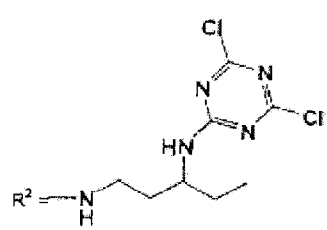
FIG.13A
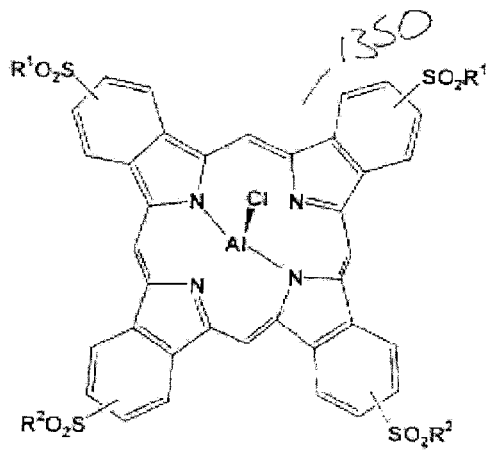

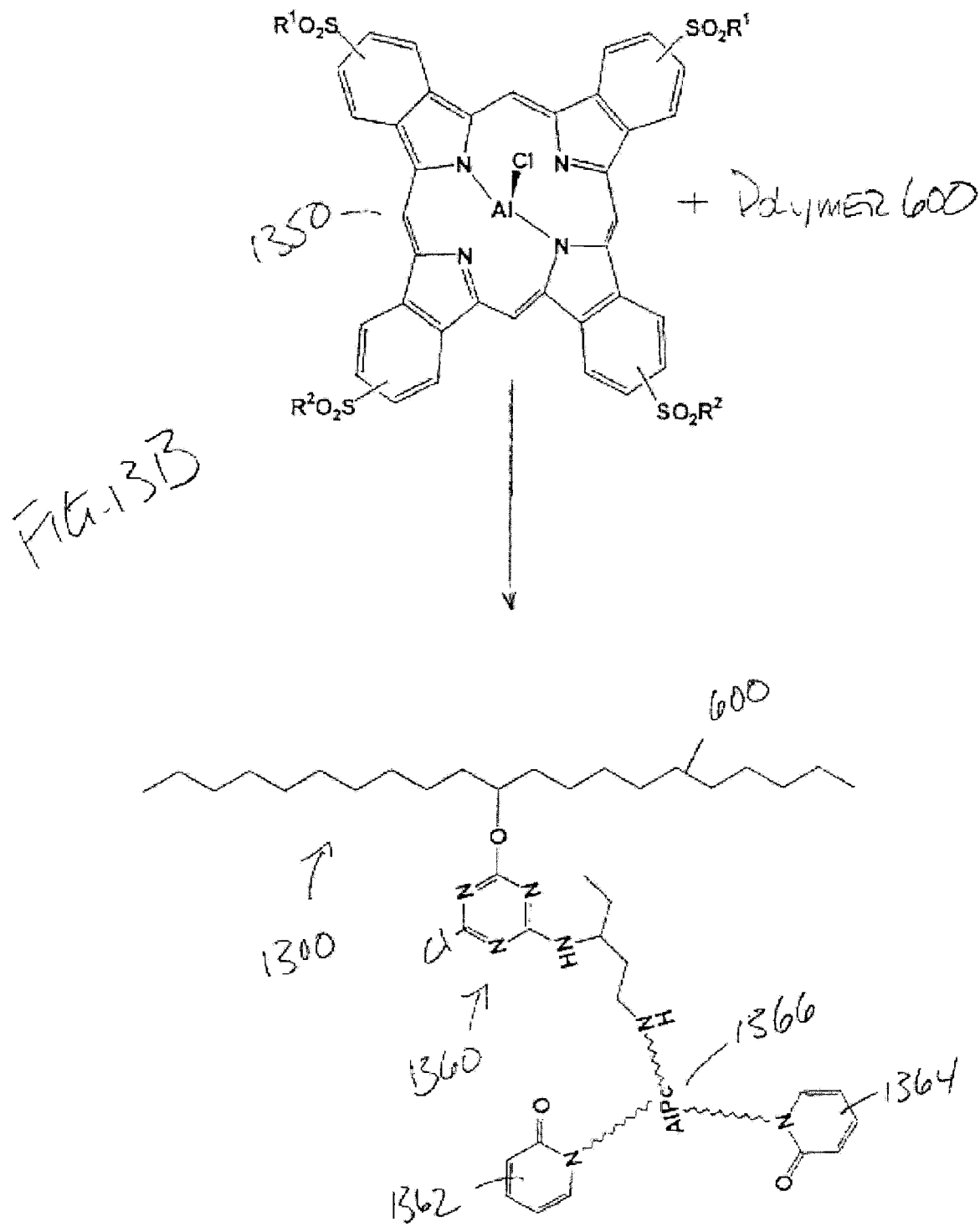

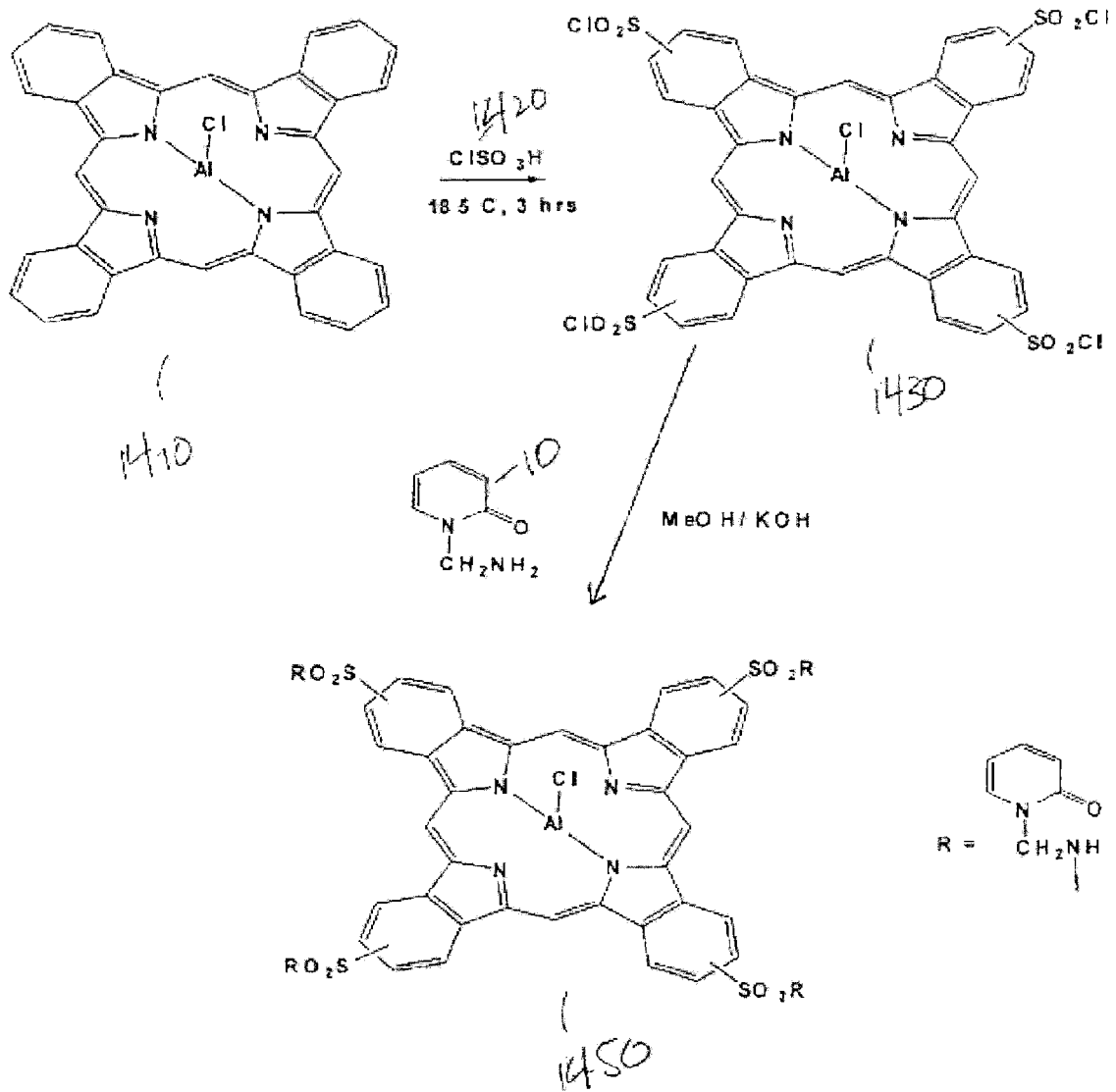

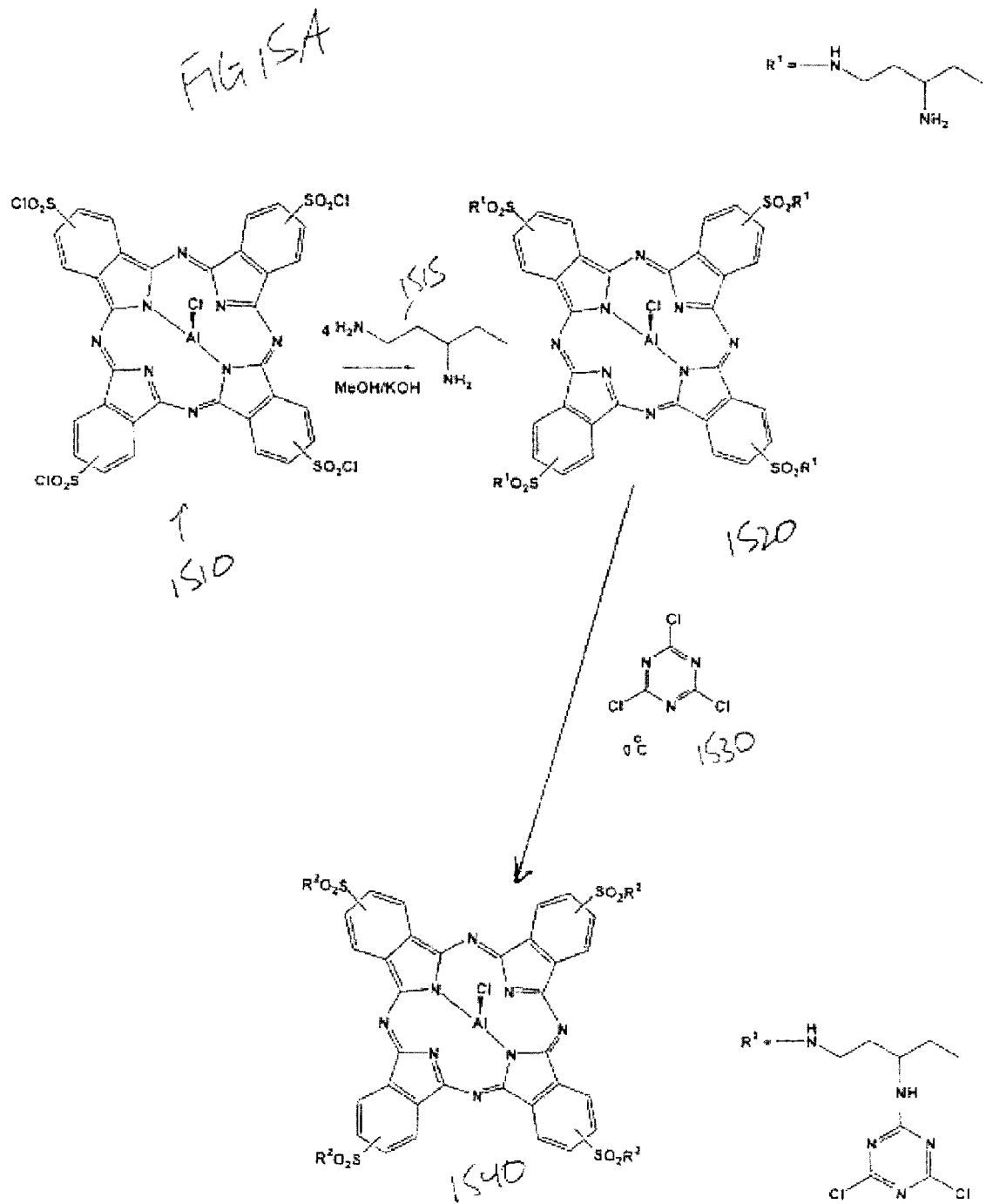

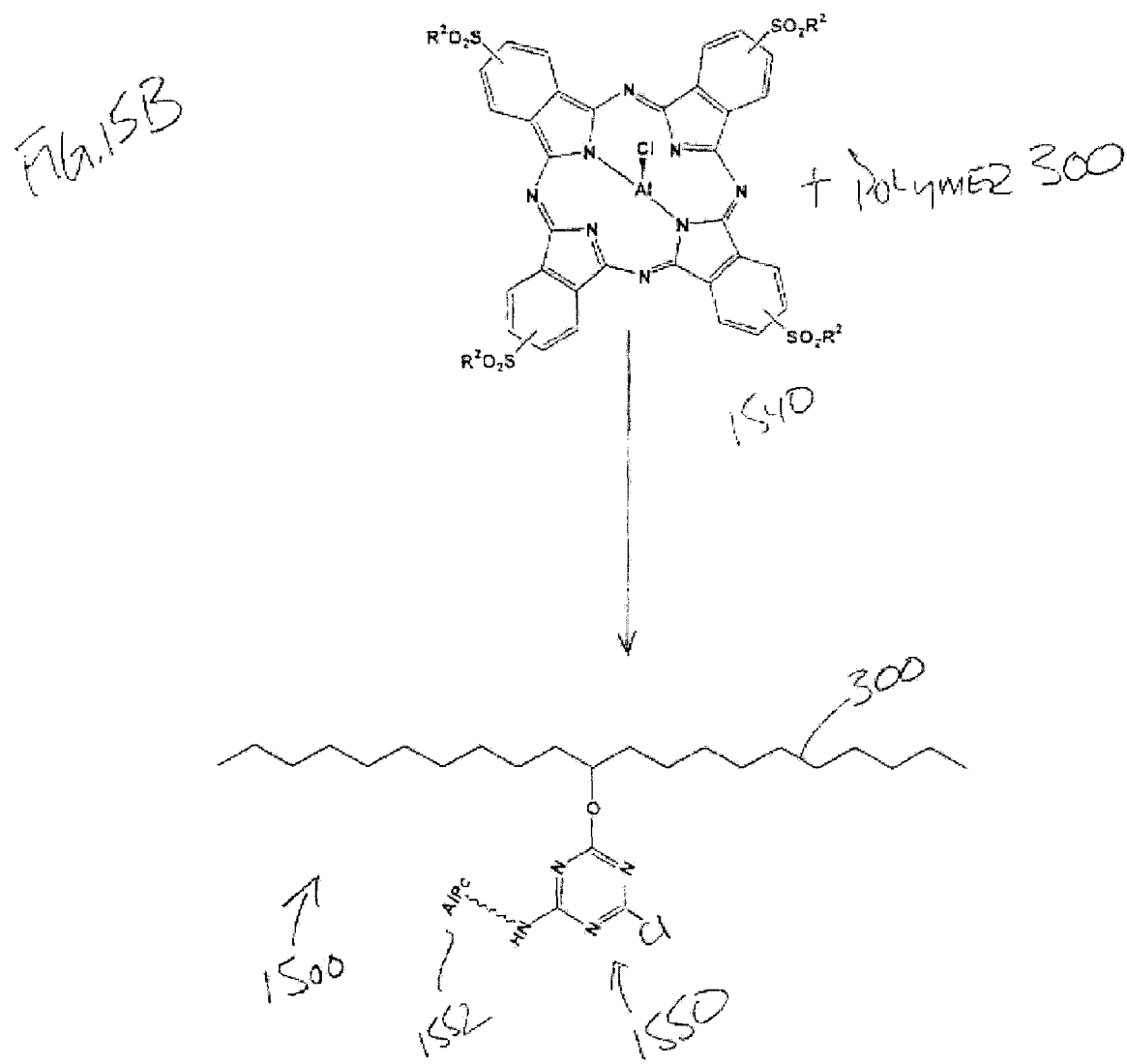

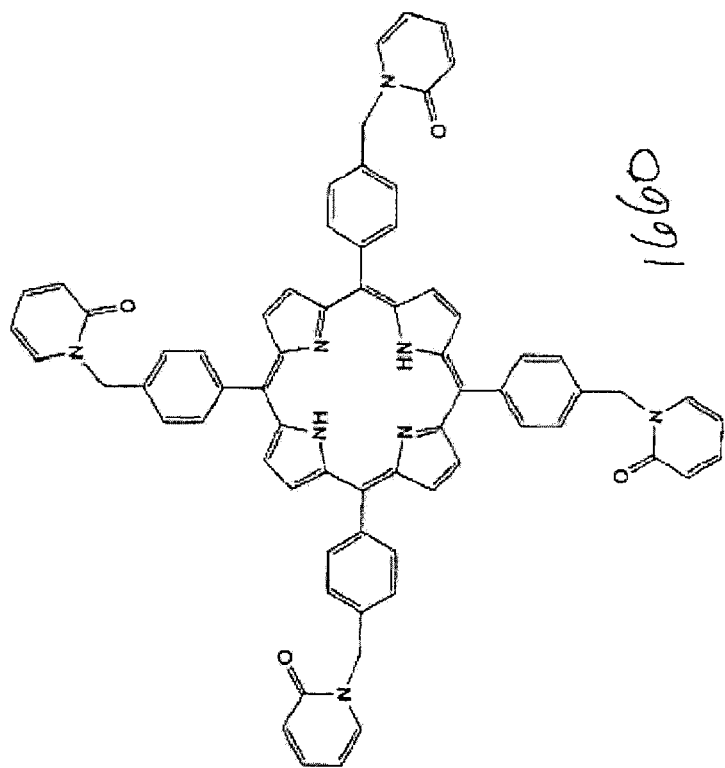
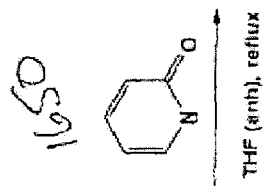
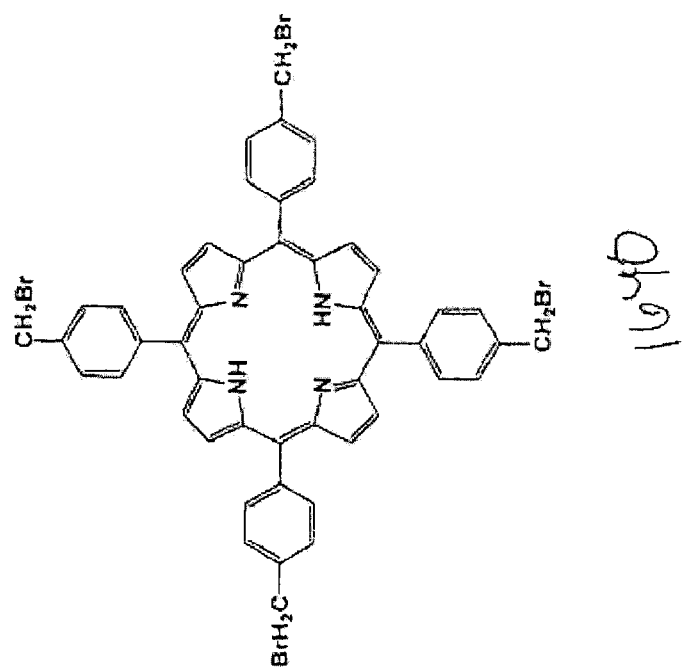
FIG. 16B

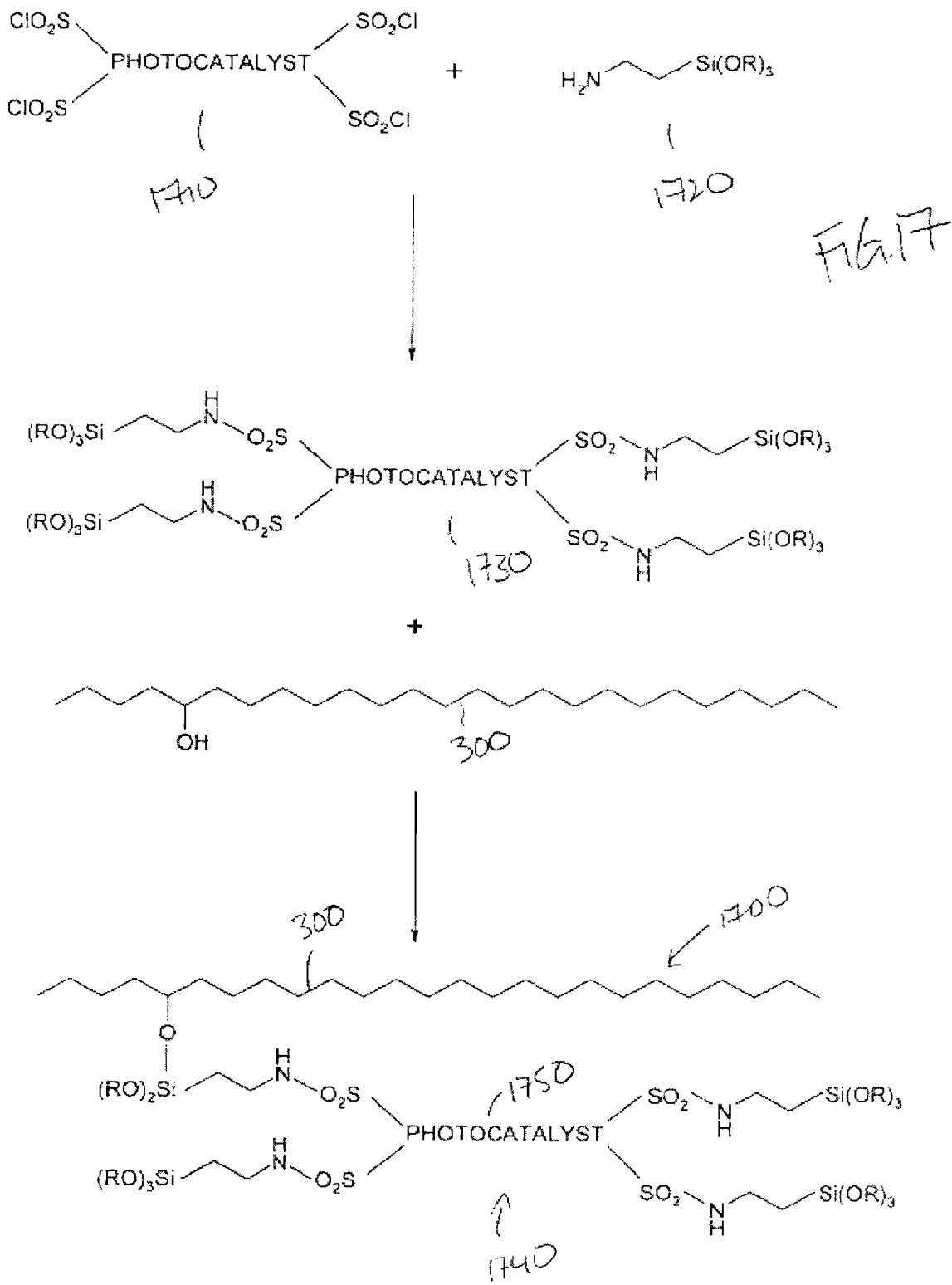

PATHOGEN-RESISTANT FABRICS

CROSS-REFERENCE TO RELATED APPLICATIONS

This application is a Continuation-In-Part Application of U.S. Utility application having Ser. No. 11/894,374, filed on Aug. 20, 2007, which claimed the benefit of U.S. Provisional Application having Ser. No. 60/950,323 filed Jul. 17, 2007, and further claims priority from U.S. Utility application having Ser. No. 10/931,121 filed Aug. 30, 2004 (now U.S. Pat. No. 7,259,122), which claimed the benefit of U.S. Provisional Application having Ser. No. 60/498,980, filed Aug. 29, 2003.

GOVERNMENT LICENSE RIGHTS

The U.S. Government has a paid-up license in this invention and the right in limited circumstances to require the patent owner to license others on reasonable terms as provided by the terms of "Lightweight and Low Cost Flexible Structure Textiles" U.S. Army Phase I Small Business Innovation Research Grant Contract No. DAAD16-03-C-0011.

FIELD OF THE INVENTION

The invention relates to pathogen-resistant fabrics.

BACKGROUND OF THE INVENTION

Exposure to pathogens, such as and without limitation toxic chemical and biological agents, is a growing concern to both military and civilian organizations alike. Areas of enhanced vulnerability include assemblies of persons, whether military or civilian.

One such scenario includes hospital patients and health care providers, who have a higher likelihood of exposure to pathogens. Another such scenario includes persons with a compromised immune system, who are more susceptible to environmental pathogens. Yet another scenario includes military personnel assembled within one or more tents and/or portable shelters.

In order to mitigate the harmful effects of an exposure to pathogens, many military shelters are constructed from fabrics which include one or more polymeric materials exhibiting barrier properties to one or more toxic agents. Many of these fabrics comprise, for example, fluoropolymers such a polytetrafluoroethylene ("PTFE"). One such composite material comprises Teflon coated Kevlar. While such composites demonstrate acceptable barrier properties, these barrier shelter fabrics are expensive and require multiple manufacturing operations to join various fabric segments. The high costs of materials in combination with high manufacturing costs limit the availability of such prior art fabrics for widespread use.

As a result, most real-world military shelters are not made from such fabrics. Rather, current shelters are formed using materials having inferior resistance. For example, forces of the United States of America typically utilize a General Purpose Shelter Fabric ("GP Fabric") manufactured from cloth coated with polyvinyl chloride ("PVC"). GP Fabric is relatively inexpensive and affords soldiers adequate protection against inclement weather including rain, snow, wind, and dust storms. Shelters made from GP Fabric, however, offer minimal protection. Such prior art shelters require an additional M28 Saranex liner to impart acceptable barrier properties. As those skilled in the art will appreciate, use of such liners adds to the overall weight, cost, and complexity, of the shelter.

SUMMARY OF THE INVENTION

A pathogen-resistant fabric is presented. The pathogen-resistant fabric comprises a polymeric material, a phthalocyanine photocatalyst, and a singlet oxygen trap molecule. The singlet oxygen trap reacts with singlet oxygen produced by the photocatalyst.

In certain embodiments, Applicant's pathogen-resistant fabrics are used in personal protective equipment. In certain embodiments, such personal protective equipment comprises clothing, such as and without limitation shirts, pants, gloves, socks, boots, helmets, and the like. In other embodiments, such personal protective equipment comprises the interior, exterior, or both, of portable shelters. Applicant's method uses conventional coating methods, such as knife coating, spray coating, calendaring, and the like. Waterborne coatings are desirable because of inherent low toxicity and low flammability properties. Applicant's coating solutions rapidly and uniformly spread over substrate surfaces, including the seams, thereby producing a continuous barrier after drying. Applicant's coating effectively "hardens" the personal protective equipment, i.e. enhances its barrier properties with respect to pathogens.

In certain embodiments, Applicant's invention can be used to form a fabric which includes a photocatalyst capable of producing singlet oxygen. In certain embodiments, Applicant's fabric includes a singlet oxygen scavenger.

BRIEF DESCRIPTION OF THE DRAWINGS

FIG. 3A is a block diagram showing a polymer chain comprising a plurality of photocatalyst moieties, and a plurality of singlet oxygen trap moieties, chemically bonded thereto;

FIG. 6B is a block diagram showing Applicant's pathogen-resistant coating comprising a plurality of the polymers of FIG. 6A;

FIG. 8 is a block diagram showing a first embodiment of the pathogen-resistant coating of FIG. 6B disposed on a first surface of a substrate, and a second embodiment of the pathogen-resistant coating of FIG. 6B disposed on a second surface of the substrate;

FIG. 11 is a block diagram showing a first embodiment of the pathogen-resistant coating of FIG. 9B disposed on a first surface of a substrate, and a second embodiment of the pathogen-resistant coating of FIG. 9B disposed on a second surface of the substrate;

FIG. 12B summarizes the steps of a reaction scheme to form a polymer comprising a pendent di-pyridone substituted porphyrin;

FIG. 13A summarizes the steps of a reaction scheme to form a di-pyridone, di-cyanuric chloride substituted phthalocyanine;

FIG. 13B summarizes the steps of a reaction scheme to form a polymer comprising a pendent di-pyridone substituted phthalocyanine;

FIG. 14 summarizes the steps of a reaction scheme to form a tetra-pyridone substituted phthalocyanine;

FIG. 15A summarizes the steps of a reaction scheme to form a tetra-cyanuric chloride substituted phthalocyanine;

FIG. 15B summarizes the steps of a reaction scheme to form a polymer comprising a pendent substituted phthalocyanine;

FIG. 16B shows the reaction of a tetra-bromo-substituted porphyrin with a pyridone anion to form a tetra-pyridone substituted porphyrin;

FIG. 17 summarizes the steps of a reaction scheme to form a polymer comprising a pendent substituted photocatalyst, wherein the photocatalyst is selected from the group consisting of a phthalocyanine and a porphyrin.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

In certain embodiments, Applicant's pathogen-resistant coating comprises a polymeric material comprising a plurality of polymer chains. By "pathogen-resistant coating," Applicant means a coating that renders a pathogen non-toxic when that pathogen comes into contact with the coating. By "pathogen," Applicant means a toxic chemical, bacterium, virus, protozoa, fungi, parasite, microbe, and combinations thereof.

In certain embodiments, Applicant's pathogen-resistant coating comprises polyvinyl alcohol ("PVOH"). In certain embodiments, Applicant's pathogen-resistant coating comprises nylon. In certain embodiments, Applicant's pathogen-resistant coating comprises polyvinylchloride. In certain embodiments, Applicant's pathogen-resistant coating comprises polyurethane.

In certain embodiments, Applicant's pathogen-resistant coating comprises an alkyl polysiloxane, such as for example polydimethylsiloxane, or polysiloxane polymer having fluorinated alkyl groups within its structure. In certain embodiments, Applicant's pathogen-resistant coating is formed using a silicone urethane oligomer sold in commerce by Sartomer Company (Exton, Pa.) under the trade name CN 990 siliconized urethane acrylate. The starting material does not comprise a pure urethane polymer. Rather, this material comprises an oligomer having reactive acrylate end groups and a midsection having alkyl urethane groups with polydimethylsiloxane grafted onto the oligomer.

Figure 1A:
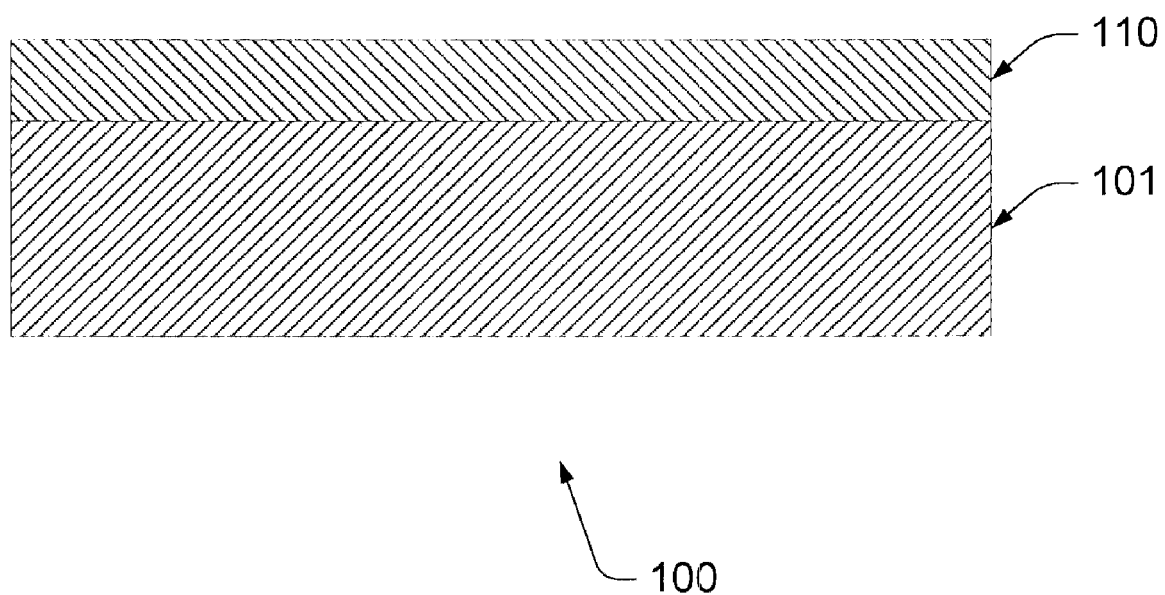
FIG. 1A is a cross-sectional view showing Applicant's pathogen-resistant coating disposed on one surface of a first embodiment of Applicant's substrate.

In use, Applicant's pathogen-resistant coating is disposed over one or more surfaces of a substrate. In the illustrated embodiment of FIG. 1A, composite 100 comprises Applicant's pathogen-resistant coating 110 disposed over one surface of substrate 101. As those skilled in the art will appreciate, pathogen-resistant coating 110 comprises a plurality of macromolecules, i.e. polymers. That plurality of individual polymeric molecules in combination form pathogen-resistant coating 110.

Alternatively, pathogen-resistant coating 110 comprises a blend of one or more polymeric materials. In certain embodiments, pathogen-resistant coating 110 comprises a blend of PVOH and polyethyleneimine ("PEI"). In certain embodiments, pathogen-resistant coating 110 comprises a blend having PEI/PVOH, wherein the PEI is present in an amount exceeding about 60 weight percent. Applicant has found that addition of PVOH to PEI considerably enhances the durability of both the primer layer and of the final the multi-layer coating, and produces a tougher, more tear resistant multi-layer coating. As those skilled in the art will appreciate, such coatings for shelters are often subjected to abrasion from both mechanical forces, i.e. handling, as well as environmental factors, i.e. dust, hail, wind, and the like.

In certain embodiments, substrate 101 comprises a fabric. By "fabric," Applicant means a flexible, planar material formed by weaving or felting or knitting or crocheting natural and/or synthetic fibers.

In certain embodiments, substrate 101 comprises polyvinylchloride. In certain embodiments, substrate 101 comprises cotton. In certain embodiments, substrate 101 comprises canvas. In certain embodiments, substrate 101 comprises leather. In certain embodiments, substrate 101 comprises polyurethane. In certain embodiments, substrate 101 comprises polyvinyl alcohol. In certain embodiments, substrate 101 comprises metal fiber filaments. In certain embodiments, substrate 101 comprises boron fibers. In certain embodiments, substrate 101 comprises carbon nanotubes. In certain embodiments, substrate 101 comprises polyester, such as polyethylene terephthalate, adipate, polycaprolactone and copolymers thereof.

In certain embodiments, substrate 101 comprises glass fiber. In certain embodiments, individual glass fibers are held together by an adhesive binder to form a chopped strand mat. In certain embodiments, the glass fibers are woven to form a fabric.

In certain embodiments, the substrate 101 comprises ceramic fibers. In certain embodiments, the ceramic fibers comprise aluminosilicate glass. In different embodiments, the ceramic fibers include various oxides, carbides, and carbonitrides and nitrides of main group and transition metal elements.

In certain embodiments, substrate 101 comprises carbon fiber filaments. In certain embodiments, the carbon fiber filaments are formed into yarn, which are woven to form a fabric.

Figure 1B:
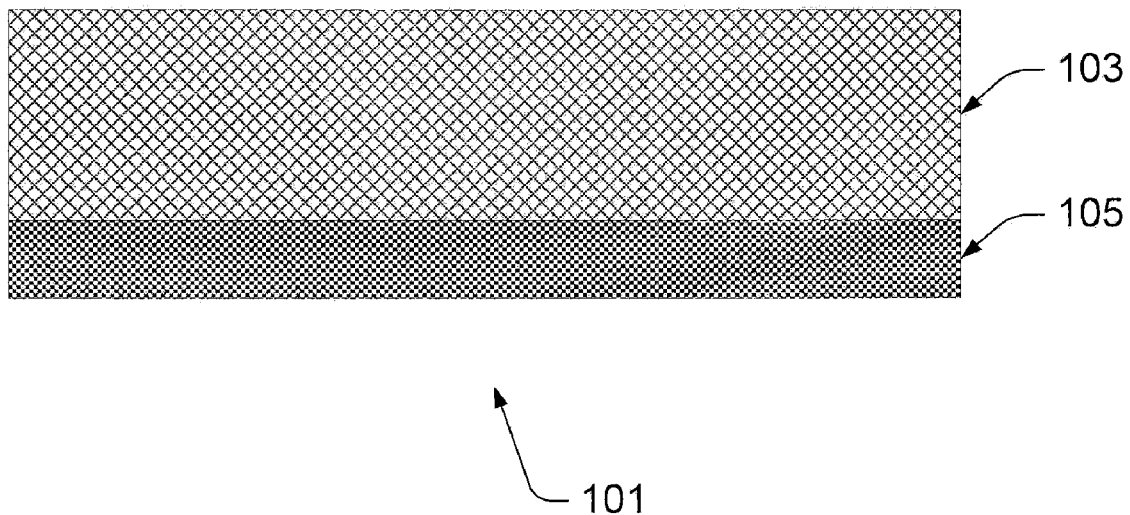
FIG. 1B is a cross-sectional view showing a second embodiment of Applicant's substrate.

In certain embodiments, substrate 101 comprises a multilayer laminate. In the illustrated embodiment of FIG. 1B, substrate 101 comprises a first polymeric material 103 and a second polymeric material 105. In certain embodiments, first polymeric material 103 comprises polyvinylalcohol. In certain embodiments, first polymeric material 103 comprises biaxially oriented polyvinylalcohol.

In certain embodiments, second polymeric material 105 comprises a thermoplastic material. In certain embodiments, second polymeric material 105 comprises a heat-sealable material. In certain embodiments, second polymeric material 105 comprises polypropylene.

Figure 1C:
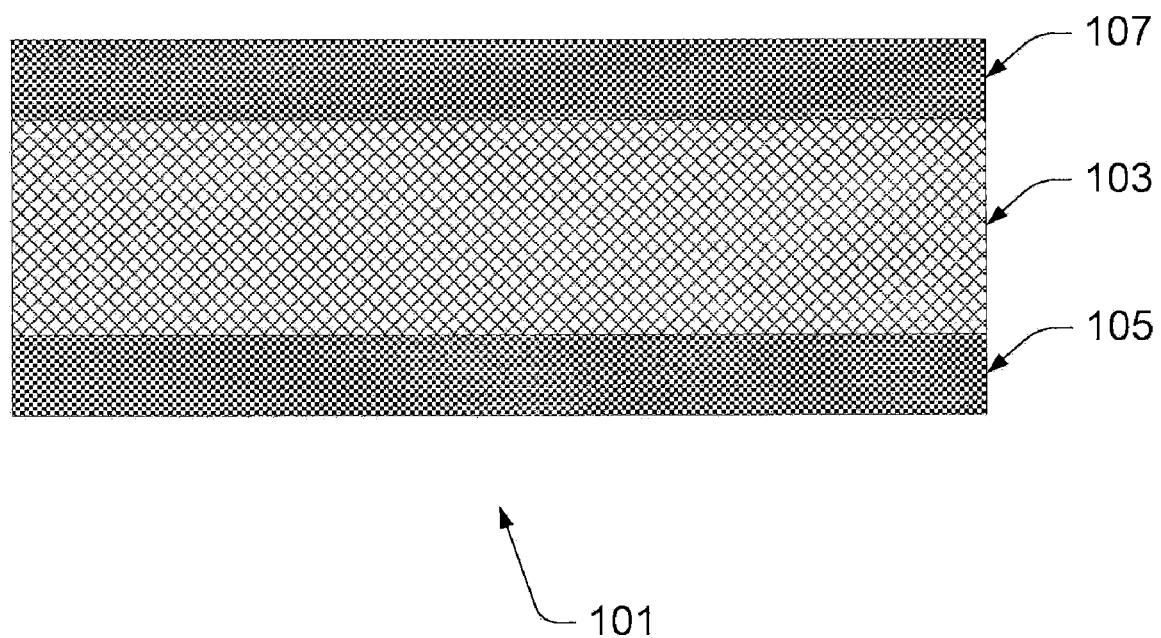
FIG. 1C is a cross-sectional view showing a third embodiment of Applicant's substrate.

In the illustrated embodiment of FIG. 1C, substrate 101 comprises a first polymeric material 103, second polymeric material 105, and third polymeric material 107. In certain embodiments, third polymeric material 107 comprises a thermoplastic material. In certain embodiments, third polymeric material 107 comprises a heat-sealable material. In certain embodiments, third polymeric material 107 comprises polypropylene.

Figure 2:
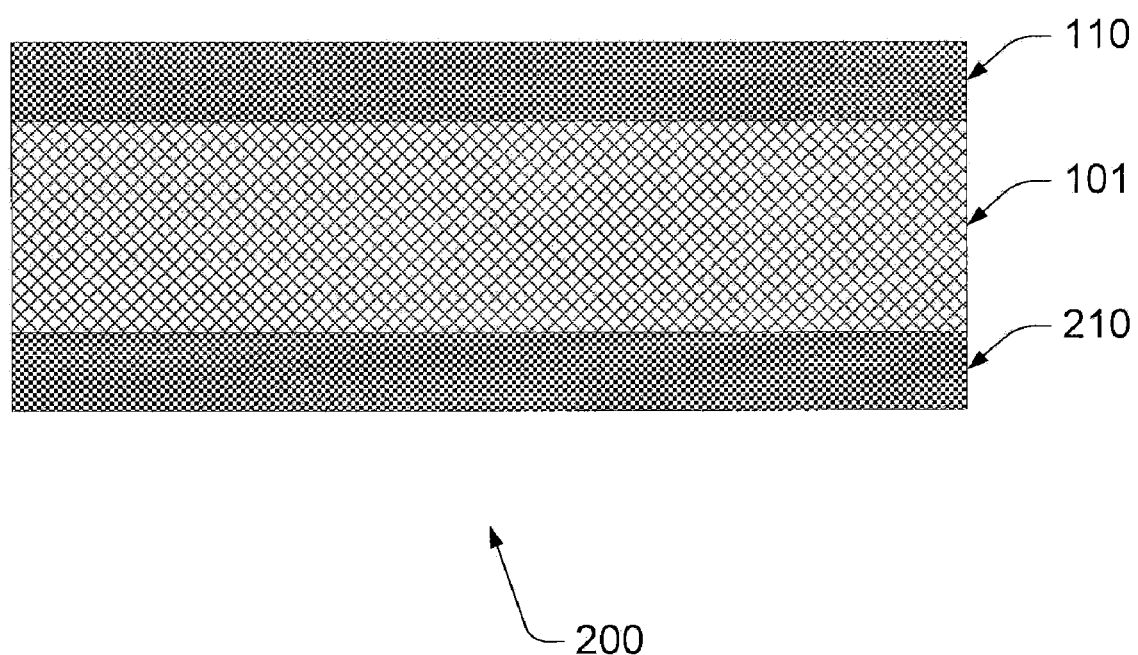
FIG. 2 is a block diagram showing Applicant's pathogen-resistant coating disposed on two surfaces of a substrate.

Referring now to FIG. 2, composite 200 comprises a first pathogen-resistant coating 110 disposed on a first surface of substrate 101 and a second pathogen-resistant coating 210 disposed on a second surface of substrate 101. In certain embodiments, first pathogen-resistant coating 110 and second pathogen-resistant coating 210 are the same. In certain embodiments, first pathogen-resistant coating 110 and second pathogen-resistant coating 210 differ.

Applicant has developed pathogen-resistant coatings that comprise a photocatalyst that is capable of producing singlet oxygen from ambient triplet oxygen. The reaction scheme for generation of singlet oxygen is shown below:

Singlet Oxygen Production

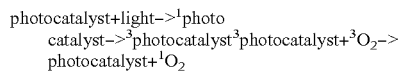

In certain embodiments, Applicant's photocatalyst comprises one or more phthalocyanine moieties, such as substituted phthalocyanine 1:

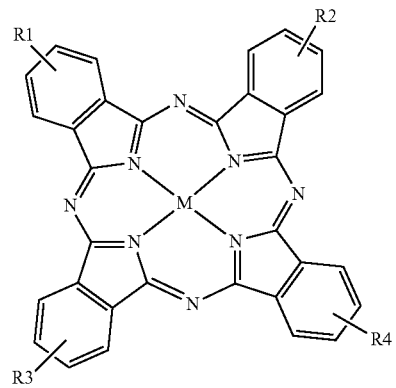

wherein R1 is selected from the group consisting of H, $SO_3H$, $CO_2H$, $SO_2Cl$, and CHO, and wherein R2 is selected from the group consisting of H, $SO_3H$, $CO_2H$, $SO_2Cl$, and CHO, and wherein R3 is selected from the group consisting of H, $SO_3H$, $CO_2H$, $SO_2Cl$, and CHO, and wherein R4 is selected from the group consisting of H, $SO_3H$, $CO_2H$, $SO_2Cl$, and CHO. All of these Pc complexes exhibit significant absorption in the visible light spectrum ($\lambda_{MAX} \approx 680$ nm) and generate singlet oxygen in high quantum yields at these wavelengths.

In certain embodiments, one or more of substituents R1, R2, R3, and/or R4 comprise a moiety capable of reversibly reacting with singlet oxygen, as described hereinbelow. In certain embodiments, one or more of substituents R1, R2, R3, and/or R4 comprise a graft moiety which allows the phthalocyanine complex to be grafted onto a polymer backbone.

In certain embodiments, Applicant's phthalocyanine does not comprise a metal. In other embodiments, Applicant's phthalocyanine comprises a metal M, wherein M is selected from the group consisting of Zn, Si, Ge, Al, and mixtures thereof, In certain embodiments, Applicant's photocatalyst comprises one or more substituted porphyrin moieties, such as substituted porphyrin 2, wherein R1, R2, R3, and R4, are described hereinabove.

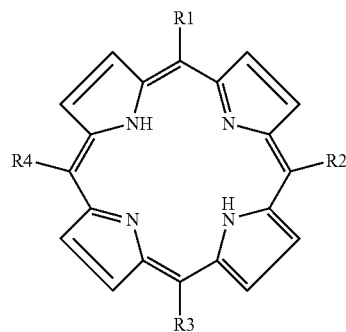

Applicant has developed fillers comprising one or more photocatalysts selected from the group consisting of substituted phthalocyanine ("Pc") complexes and substituted porphyrin ("$P_{OR}$") complexes, wherein those one or more photocatalysts become highly photoactive upon exposure to visible light and generate singlet oxygen from ambient air. Applicant's photocatalysts rapidly generate excited singlet state oxygen (typically within a few nanoseconds) after exposure to light. Singlet oxygen has been shown to be a very effective oxidizing agent capable of decomposing both toxic chemicals as well as pathogens. The high chemical stability of these complexes enables them to continually produce singlet oxygen over a long time period without losing their activity. Furthermore, Applicant's photocatalysts are inexpensive, widely available, and are of low toxicity making them attractive self-regenerating candidate catalysts for toxic chemical/pathogen deactivation.

In certain embodiments, one or more photocatalysts are directly grafted onto the polymers comprising Applicant's pathogen-resistant coating, and/or added as a filler dispersed within one or more of coatings 110 (FIGS. 1A and 2) and/or 210 (FIG. 2). In certain embodiments, Applicant's photocatalysts are used in combination with titanium dioxide nanoparticles which are also photoreactive. In certain embodiments, Applicant's pathogen-resistant coating includes a plurality of photocatalysts comprising a first photocatalyst comprising a first structure and a second photocatalyst comprising a second structure, wherein the first structure differs from the second structure.

In certain embodiments, Applicant's pathogen-resistant coating comprises one or more photocatalysts, in combination with one or more compounds that function as singlet oxygen storage systems, i.e. a reversible singlet oxygen trap. As illustrated below, Singlet Oxygen Trap 3 reversibly adds singlet oxygen molecule 4 to form endoperoxide 5.

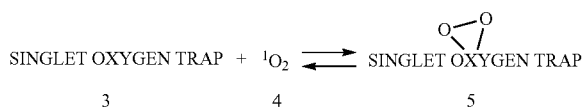

In certain embodiments, Applicant's pathogen-resistant coating comprises one or more photocatalysts in combination with one or more singlet oxygen trap molecules/moieties. In these embodiments, Applicant's one or more photocatalysts produce singlet oxygen during daylight hours, wherein a portion of that singlet oxygen remains available to oxidize pathogens, and wherein a portion of the singlet oxygen produced is scavenged, i.e. stored, by the one or more singlet oxygen traps which then release that stored singlet oxygen throughout the nighttime hours giving Applicant's pathogen-resistant coating a time-release decontamination capability.

In certain embodiments, Applicant's singlet oxygen trap comprises substituted 9,10-diphenylanthracene, compound 6, wherein R9 is H, CH$_3$, OCH$_3$, and R10 is H, CH$_3$, and OCH$_3$.

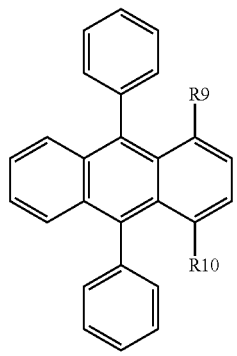

9,10-diphenylanthracene reversibly adds singlet oxygen generated by Applicant's photocatalyst to form the 9,10-endoperoxide compound 7. Endoperoxide 7 releases singlet oxygen over time.

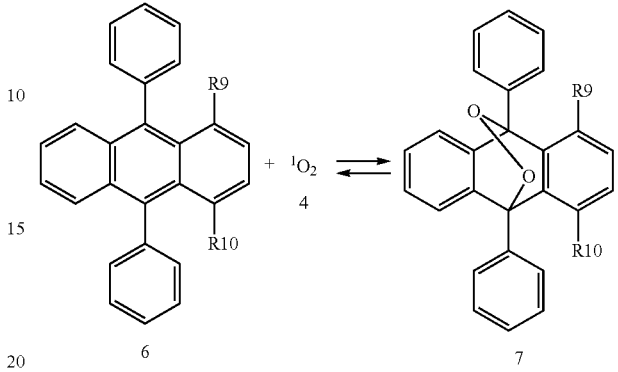

In other embodiments, Applicant's singlet oxygen trap comprises 3-(4-methyl-1-naphthylpropionic acid. In these embodiments, the 3-(4-methyl-1-naphthylpropionic acid reversibly adds singlet oxygen produced Applicant's one or more photocatalysts to form endoperoxide 8.

Endoperoxide 8 releases singlet oxygen over time.

In other embodiments, Applicant's singlet oxygen trap comprises 9,10-diphenylanthracene-2,3-dicarboxylic acid methyl ester. In these embodiments, the 9,10-diphenylanthracene-2,3-dicarboxylic acid methyl ester reversibly adds singlet oxygen produced by Applicant's one or more photocatalysts to form endoperoxide 9.

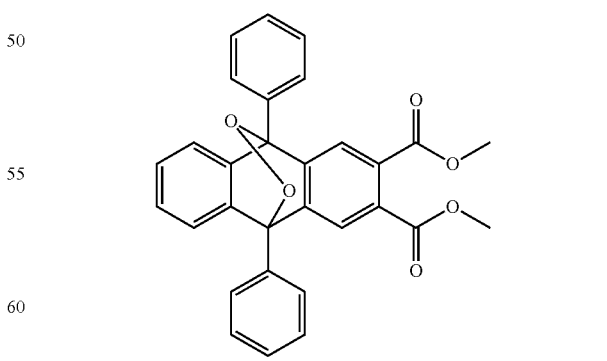

Endoperoxide 9 releases singlet oxygen over time.

In other embodiments, Applicant's shelter coating includes rubrene, alkyl naphthalenes, stryryl anthracene copolymers, methyl substituted poly(vinylnaphthalenes, 2,5-diphenylfuran. As a general matter, 1,4-substituted naphthalenes having electron donating substitutents are preferred scavengers based upon their commercial availability and ability to reversibly re-generate singlet oxygen in high yield.

In still other embodiments, Applicant's singlet oxygen trap comprises a substituted pyridone 10 which reversibly adds singlet oxygen produced by Applicant's one or more photocatalysts to form endoperoxide 11.

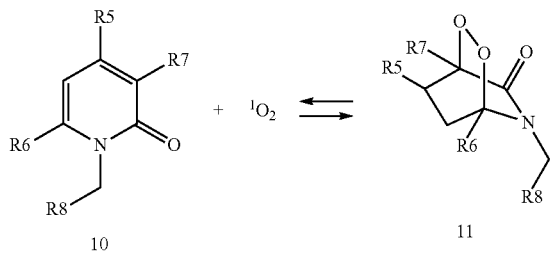

In certain embodiments, R5 is selected from the group consisting of H and $CH_3$. In certain embodiments, R6 is selected from the group consisting of H and $CH_3$. In certain embodiments, R7 is selected from the group consisting of H and $CH_3$. In certain embodiments, R8 is selected from the group consisting of phenyl, benzyl, p-CN phenyl, $(CH_2)_5CH_3$, $CH_2CO_2CH_3$, $CH_2CO_2CH_2CH_3$, and OH.

In yet other embodiments, Applicant's singlet oxygen trap comprises a substituted isoquinolinone 12 which reversibly adds singlet oxygen produced by Applicant's one or more photocatalysts to form endoperoxide 13.

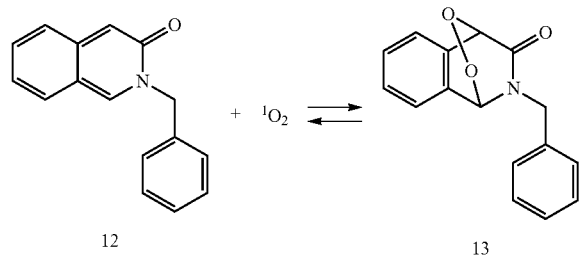

Figure 16A:
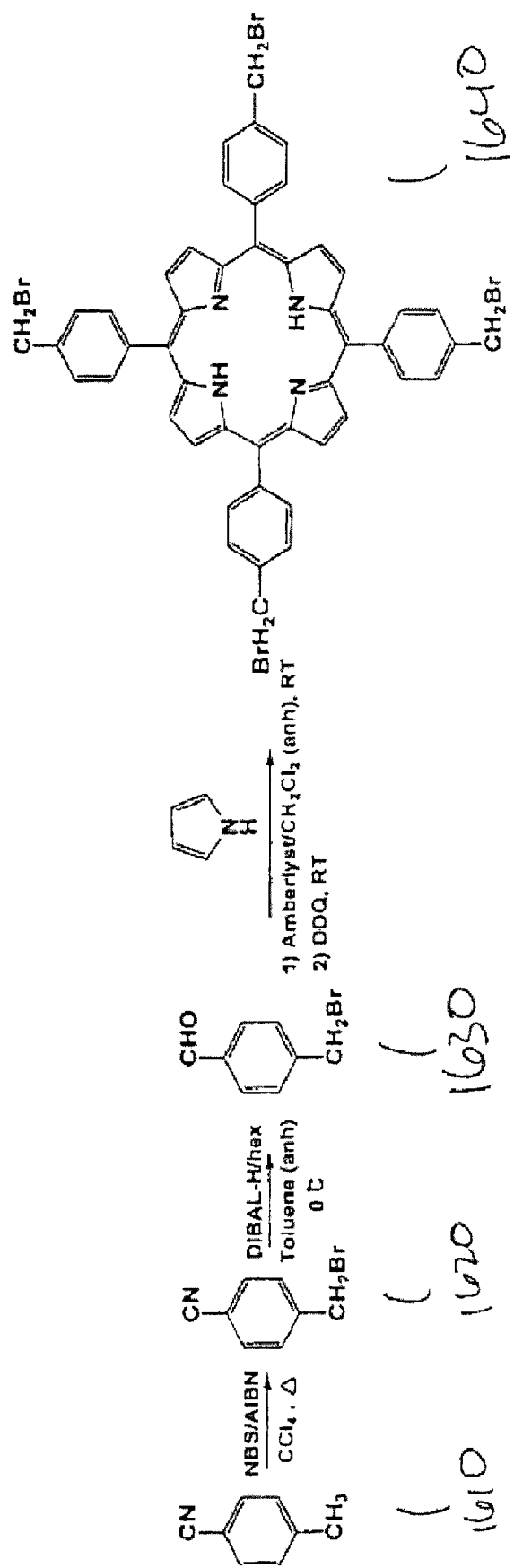
FIG. 16A summarizes the steps of a reaction scheme to form a tetra-bromo substituted porphyrin.

In certain embodiments, Applicant's pathogen-resistant coating comprises a compound dispersed therein, wherein that compound comprises a photocatalyst moiety and one or more singlet oxygen trap moieties. For example and referring now to FIG. 16A, cyanotoluene 1610 is brominated to form compound 1620 which is oxidized to form aldehyde 1630 which is cyclized to form substituted porphyrin 1640. Referring now to FIG. 16B, substituted porphyrin 1640 is reacted with pyridone anion 1650 to form tetra-pyridone substituted porphyrin 1660. Compound 1660 comprises a porphyrin photocatalyst moiety in combination with four pendent pyridone singlet oxygen trap moieties.

In certain embodiments, tetra-pyridone substituted porphyrin 1660 is dispersed within Applicant's pathogen-resistant coating 110 and/or 210. Applicant has found that tetra-pyridone substituted porphyrin 1660 is incompatible with the polymers comprising pathogen-resistant coating 110 and/or 210, and as a result, tetra-pyridone substituted porphyrin 1660 blooms to the surface of that coating.

Referring now to FIG. 14, phthalocyanine complex 1410 is reacted with chlorosulfonic acid 1420 to form substituted phthalocyanine complex 1430 which is reacted with substituted pyridone 10 to form tetra-pyridone substituted phthalocyanine complex 1450. Compound 1450 comprises a phthalocyanine photocatalyst moiety in combination with four pendent pyridone singlet oxygen traps.

In certain embodiments, tetra-pyridone substituted phthalocyanine complex 1450 is dispersed within Applicant's pathogen-resistant coating 110 and/or 210. Applicant has found that tetra-pyridone substituted phthalocyanine complex 1450 is incompatible with the polymers comprising pathogen-resistant coating 110 and/or 210, and as a result, tetra-pyridone substituted phthalocyanine complex 1450 blooms to the surface of that coating.

Referring now to FIG. 3A, in certain embodiments Applicant's pathogen-resistant coating comprises polymer 300, wherein polymer 300 comprises a plurality of photocatalysts, and a plurality of singlet oxygen traps, chemically bonded to thereto. By "chemically bonded thereto," Applicant means disposed in a pendent group, wherein that pendent group is attached to a polymer chain.

In certain embodiments, polymer 300 comprises for example and without limitation polyvinyl alcohol, polystyrene, polyolefins (such as polyethylene, polypropylene), cellulose, polyacrylates, polyalkykacrylates, polycarbonate, polyvinylchloride, polyurethane, siloxane, a cellulosic material (such as cellulose acetate, cellulose acetate butyrate, cellulose nitrate and rayon), polyamides (such as nylon homopolymers and copolymers, including Nylon 6, Nylon 6,6 Nylon 11 and Nylon 12, Kevlar, Nomex and related aromatic polyamides, and silk), polyacrylonitrile, polyester, and the like, and combinations thereof.

In the illustrated embodiment of FIG. 3A, polymer 300 comprises photocatalyst 310 and photocatalyst 330 chemically bonded thereto, in combination with singlet oxygen trap 320 and singlet oxygen trap 340 chemically bonded thereto. In certain embodiments, singlet oxygen trap 320 comprises a first structure and singlet oxygen trap 340 comprises a second structure, wherein the first structure differs from the second structure. In certain embodiments, photocatalyst 310 comprises a first structure and photocatalyst 330 comprises a second structure, wherein the first structure differs from the second structure.

Referring now to FIG. 15A, tetra-chlorosulfonated phthalocyanine complex 1510 is reacted with diamine 1515 to form derivatized phthalocyanine complex 1520 comprising a plurality of pendent amino groups. Derivatized phthalocyanine complex 1520 is reacted with cyanuric chloride 1530 to form derivatized phthalocyanine complex 1540 comprising a plurality of pendent cyanuric chloride groups. Referring now to FIG. 15B, derivatized phthalocyanine complex 1540 is reacted with a hydroxyl group on polymer 300 to form polymer 1500 which comprises a pendent group 1550 comprising substituted Al-phthalocyanine photocatalyst 1552.

Referring now to FIG. 17, tetra-chlorosulfonated photocatalyst 1710 is reacted with an aminosiloxane, such as for example and without limitation gamma-aminopropyltrialkoxysilane 1720 to form tetrasiloxy-substituted photocatalyst 1730. In certain embodiments, the tetra-chlorosulfonated photocatalyst 1710 comprises a substituted phthalocyanine. In certain embodiments, the tetra-chlorosulfonated photocatalyst 1710 comprises a substituted porphyrin. In certain embodiments, gamma-aminopropyltrialkoxysilane 1720 comprises gamma-aminopropyltrimethoxysilane. In certain embodiments, gamma-aminopropyltrialkoxysilane 1720 comprises gamma-aminopropyltriethoxysilane. Tetrasiloxy-substituted photocatalyst 1730 is reacted with hydroxy-substituted polymer 300 to form polymer 1700 which comprises a pendent group 1740 comprising a photocatalyst selected from the group consisting of a substituted phthalocyanine and a substituted porphyrin.

In certain embodiments, Applicant's pathogen-resistant coating comprises a plurality of polymers 1700 in combination with a plurality of singlet oxygen traps 1450. In certain embodiments, Applicant's pathogen-resistant coating comprises a plurality of polymers 1700 in combination with a plurality of singlet oxygen traps 1660.

Figure 3B:
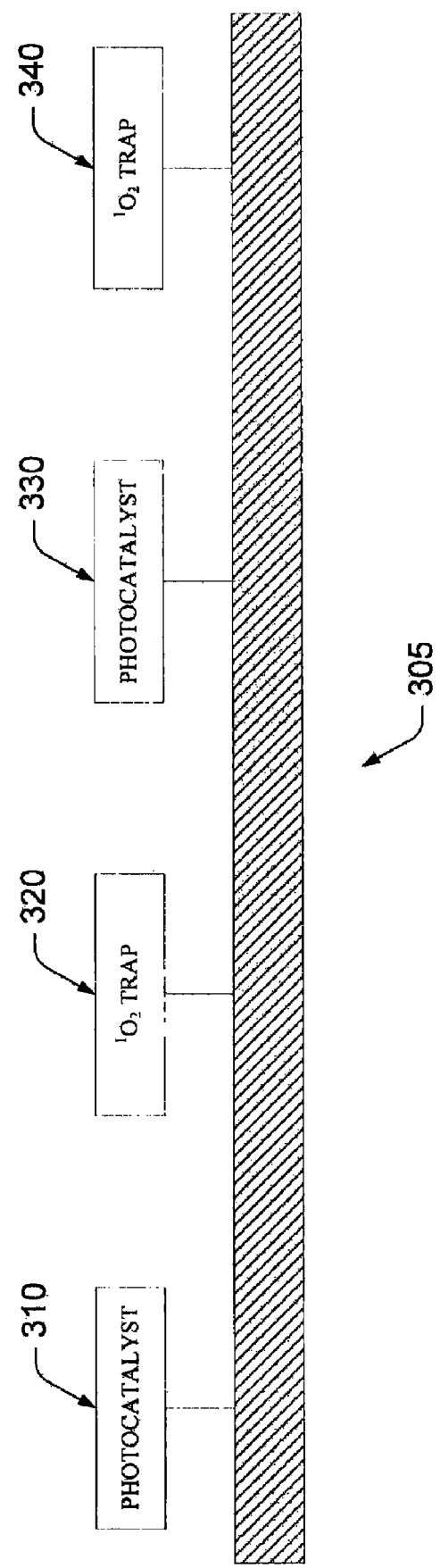
FIG. 3B is a block diagram showing Applicant's pathogen-resistant coating comprising a plurality of the polymers of FIG. 3A.

Referring now to FIG. 3B, in certain embodiments pathogen-resistant coating 305 comprises a plurality of polymers 300 which in combination form pathogen-resistant coating 305. In certain embodiments, Applicant's pathogen-resistant coating 305 comprises a first plurality of polymers 300 and a second plurality of polymers 300, wherein each of the first plurality of polymers 300 comprise a photocatalyst 310 and each of the second plurality of polymers 300 comprise a photocatalyst 330. In certain embodiments, Applicant's pathogen-resistant coating 305 comprises a first plurality of polymers 300 and a second plurality of polymers 300, wherein each of the first plurality of polymers 300 comprise a singlet oxygen trap 320, and each of the second plurality of polymers 300 comprise a singlet oxygen trap 340.

Figure 4:
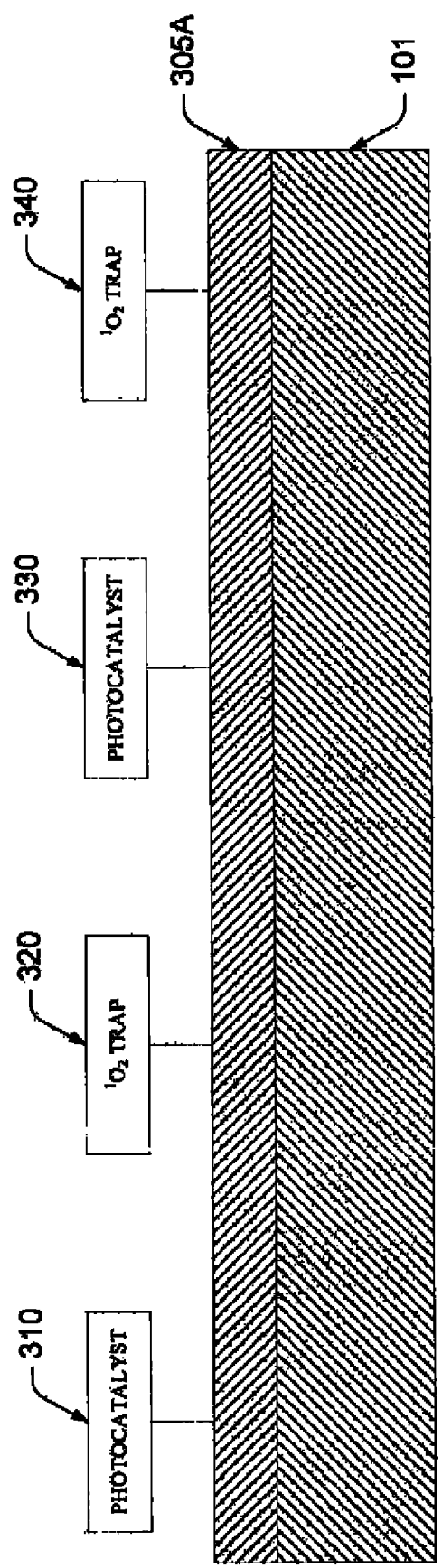
FIG. 4 is a block diagram showing a first embodiment of the pathogen-resistant coating of FIG. 3B disposed on one surface of a substrate.

FIG. 4 illustrates pathogen-resistant coating 305A disposed on a first surface of substrate 101. In certain embodiments, Applicant's pathogen-resistant coating 305A comprises a first plurality of polymers 300 and a second plurality of polymers 300, wherein each of the first plurality of polymers 300 comprise a photocatalyst 310 and each of the second plurality of polymers 300 comprise a photocatalyst 330. In certain embodiments, Applicant's pathogen-resistant coating 305A comprises a first plurality of polymers 300 and a second plurality of polymers 300, wherein each of the first plurality of polymers 300 comprise a singlet oxygen trap 320, and each of the second plurality of polymers 300 comprise a singlet oxygen trap 340.

Figure 5:
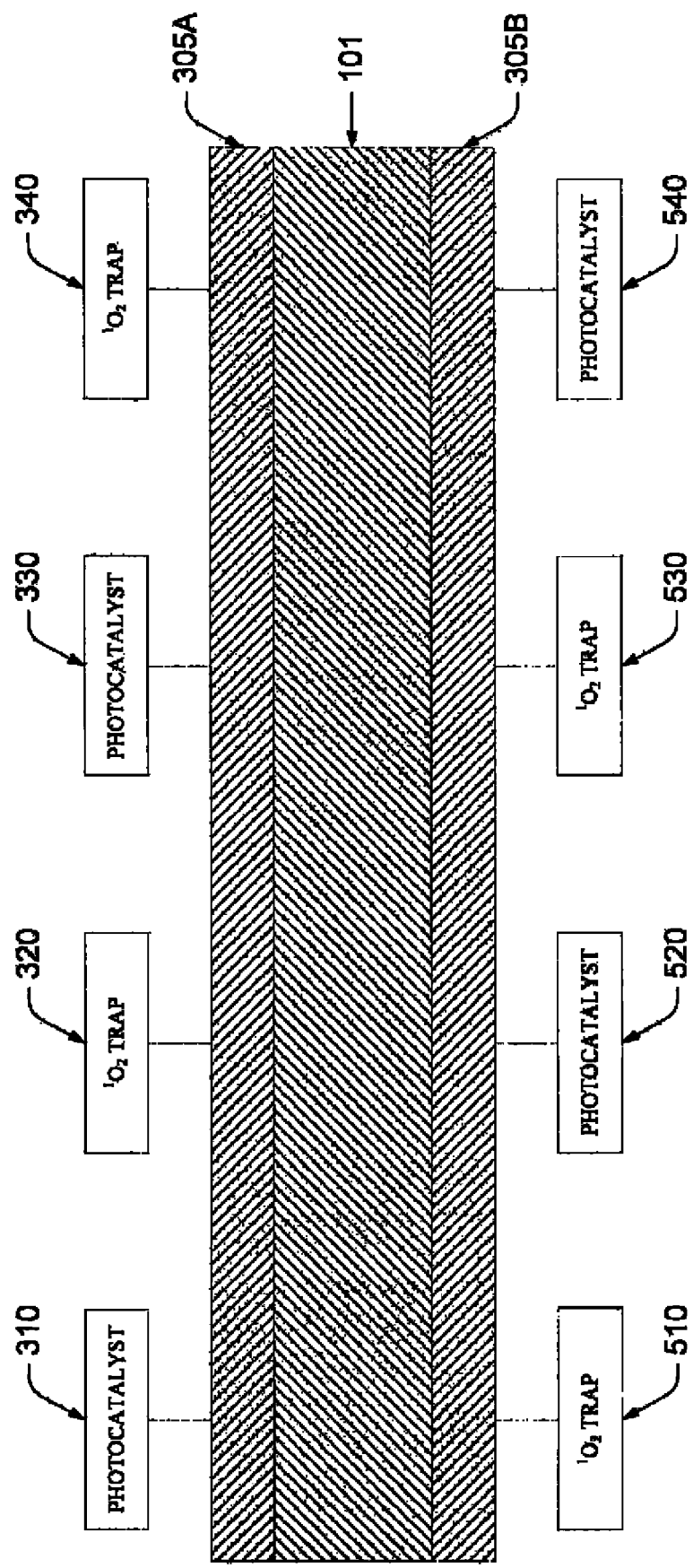
FIG. 5 is a block diagram showing a first embodiment of the pathogen-resistant coating of FIG. 3B disposed on a first surface of a substrate, and a second embodiment of the pathogen-resistant coating of FIG. 3B disposed on a second surface of the substrate.

FIG. 5 illustrates pathogen-resistant coating 305A disposed on a first surface of substrate 101, and pathogen-resistant coating 305B disposed on a second surface of substrate 101. In certain embodiments, Applicant's pathogen-resistant coating 305B comprises a first plurality of polymers 300 and a second plurality of polymers 300, wherein each of the first plurality of polymers 300 comprise a photocatalyst 520 and each of the second plurality of polymers 300 comprise a photocatalyst 540. In certain embodiments, Applicant's pathogen-resistant coating 305B comprises a first plurality of polymers 300 and a second plurality of polymers 300, wherein each of the first plurality of polymers 300 comprise a singlet oxygen trap 510, and each of the second plurality of polymers 300 comprise a singlet oxygen trap 530.

Figure 6A:
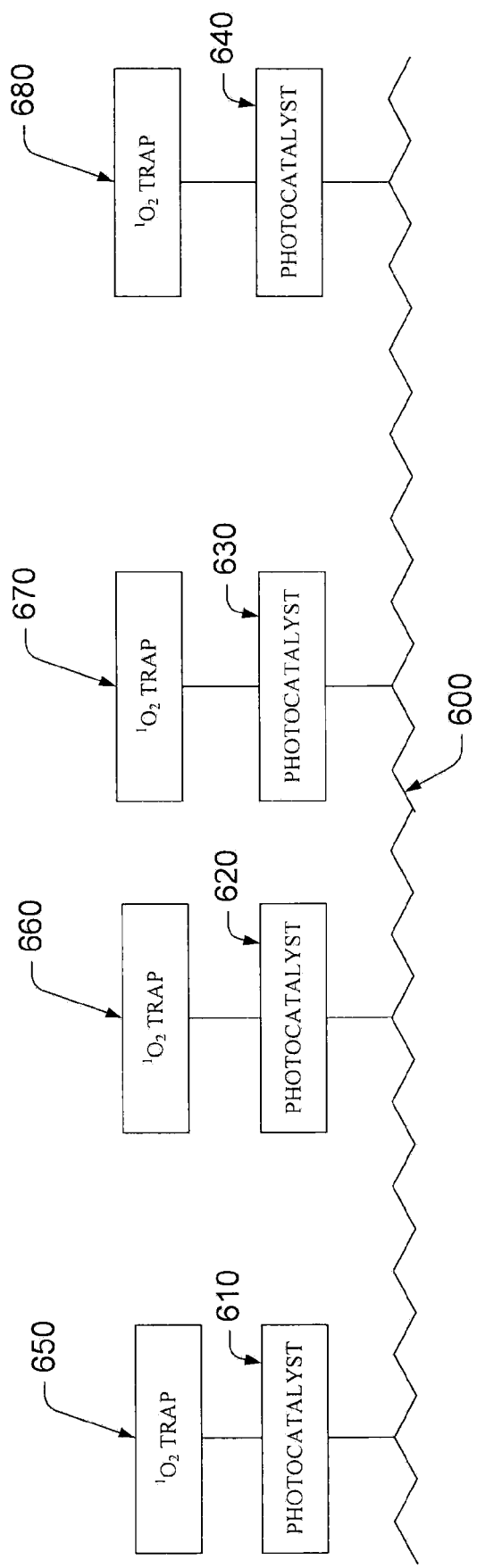
FIG. 6A is a block diagram showing a polymer chain comprising a plurality of photocatalyst moieties chemically bonded thereto, wherein a singlet oxygen trap is chemically attached to each photocatalyst moiety.

Referring now to FIG. 6A, in certain embodiments Applicant's pathogen-resistant coating comprises polymer 600, wherein polymer 600 comprises a plurality of photocatalysts chemically bonded to thereto in combination with a plurality of singlet oxygen traps chemically bonded thereto.

In certain embodiments, polymer 600 comprises for example and without limitation polyvinyl alcohol, polystyrene, polyolefins (such as polyethylene, polypropylene), cellulose, polyacrylates, polyalkykacrylates, polycarbonate, polyvinylchloride, polyurethane, siloxane, a cellulosic material (such as cellulose acetate, cellulose acetate butyrate, cellulose nitrate and rayon), polyamides (such as nylon homopolymers and copolymers, including Nylon 6, Nylon 6,6 Nylon 11 and Nylon 12, Kevlar, Nomex and related aromatic polyamides, and silk), polyacrylonitrile, polyester, and the like, and combinations thereof.

In the illustrated embodiment of FIG. 6A, polymer 600 comprises photocatalysts 610, 620, 630, and 640 chemically bonded thereto. Further in the illustrated embodiment of FIG. 6A, singlet oxygen trap 650 is chemically bonded to photocatalyst 610, singlet oxygen trap 660 is chemically bonded to photocatalyst 630, singlet oxygen trap 670 is chemically bonded to photocatalyst 630, and singlet oxygen trap 680 is chemically bonded to photocatalyst 640.

Figure 12A:
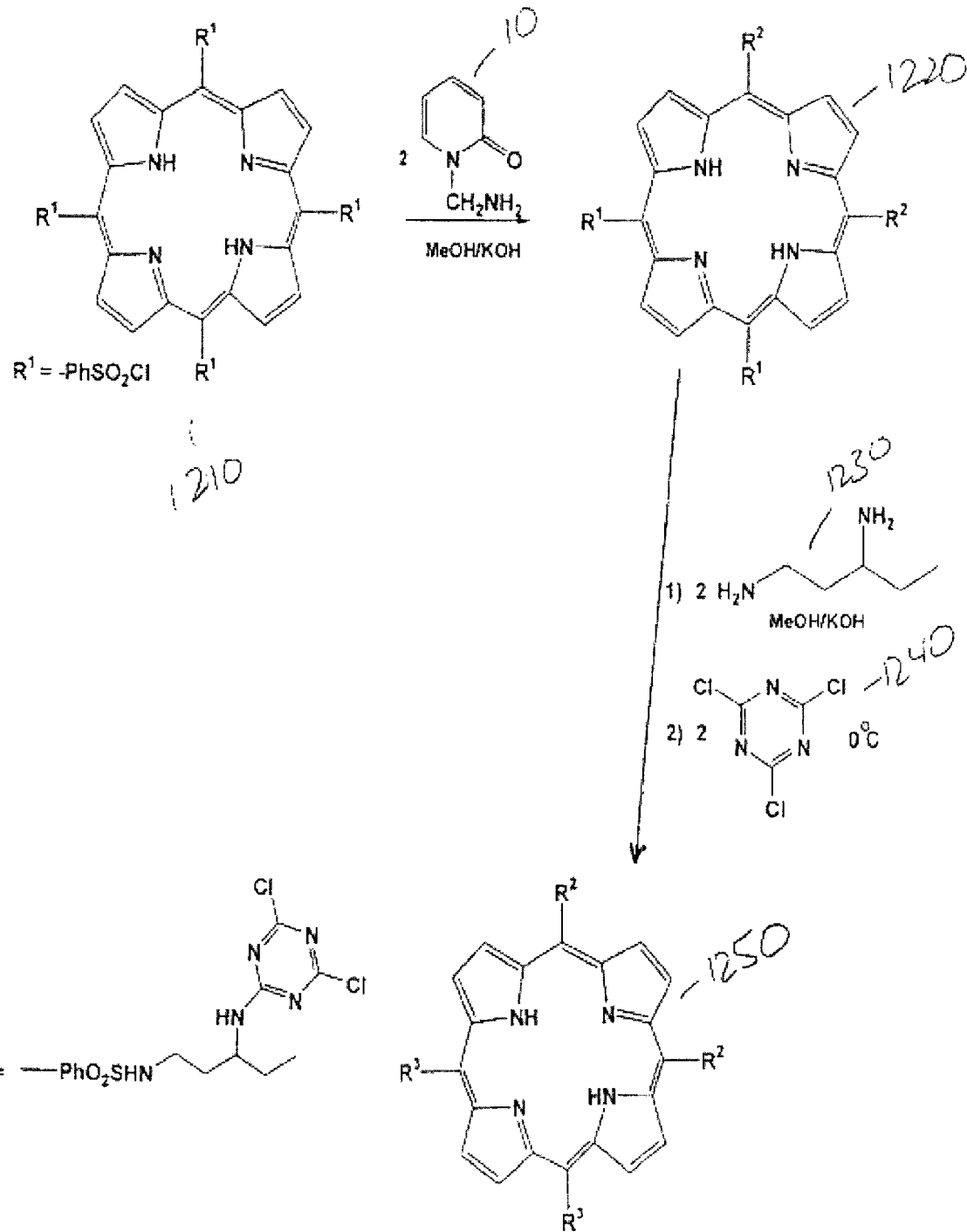
FIG. 12A summarizes the steps of a reaction scheme to form a di-pyridone, di-cyanuric chloride substituted porphyrin.

Referring now to FIG. 12A, tetra-substituted porphyrin 1210 is reacted with 2 equivalents of pyridone 10 to form di-pyridone substituted porphyrin 1220 which is reacted with diamine 1230 and then with cyanuric chloride 1240 to form di-pyridone, di-cyanuric chloride substituted porphyrin 1250. Referring now to FIG. 12B, di-pyridone, di-cyanuric chloride substituted porphyrin 1250 is reacted with a hydroxyl group on polymer 600 to form polymer 1200 comprising polymeric backbone 600 having pendent group 1260 attached thereto. Pendent group 1260 comprises porphyrin photocatalyst 1266 in combination with pyridone singlet oxygen trap 1262 and pyridone oxygen trap 1264.

As those skilled in the art will appreciate, adjusting the equivalents of pyridone 10, diamine 1230, and cyanuric chloride 1240 used, the reaction scheme of FIGS. 12A and 12B can be modified to form a polymer 600 comprising a pendent group which comprises porphyrin photocatalyst 1266 in combination with one, two, or three, pyridone singlet oxygen traps 1262.

Referring now to FIG. 13A, tetra-substituted phthalocyanine 1310 is reacted with 2 equivalents of pyridone 10 to form di-pyridone substituted phthalocyanine 1320 which is reacted with diamine 1330 and then with cyanuric chloride 1340 to form di-pyridone, di-cyanuric chloride substituted phthalocyanine 1350. Referring now to FIG. 13B, di-pyridone, di-cyanuric chloride substituted phthalocyanine 1350 is reacted with a hydroxyl group on polymer 600 to form polymer 1300 comprising polymeric backbone 600 having pendent group 1360 attached thereto. Pendent group 1360 comprises phthalocyanine photocatalyst 1366 in combination with pyridone singlet oxygen trap 1362 and pyridone oxygen trap 1364.

As those skilled in the art will appreciate, adjusting the equivalents of pyridone 10, diamine 1330, and cyanuric chloride 1340 used, the reaction scheme of FIGS. 13A and 13B can be modified to form a polymer 600 comprising a pendent group which comprises phthalocyanine photocatalyst 1366 in combination with one, two, or three, pyridone singlet oxygen traps 1362.

Figure 18:
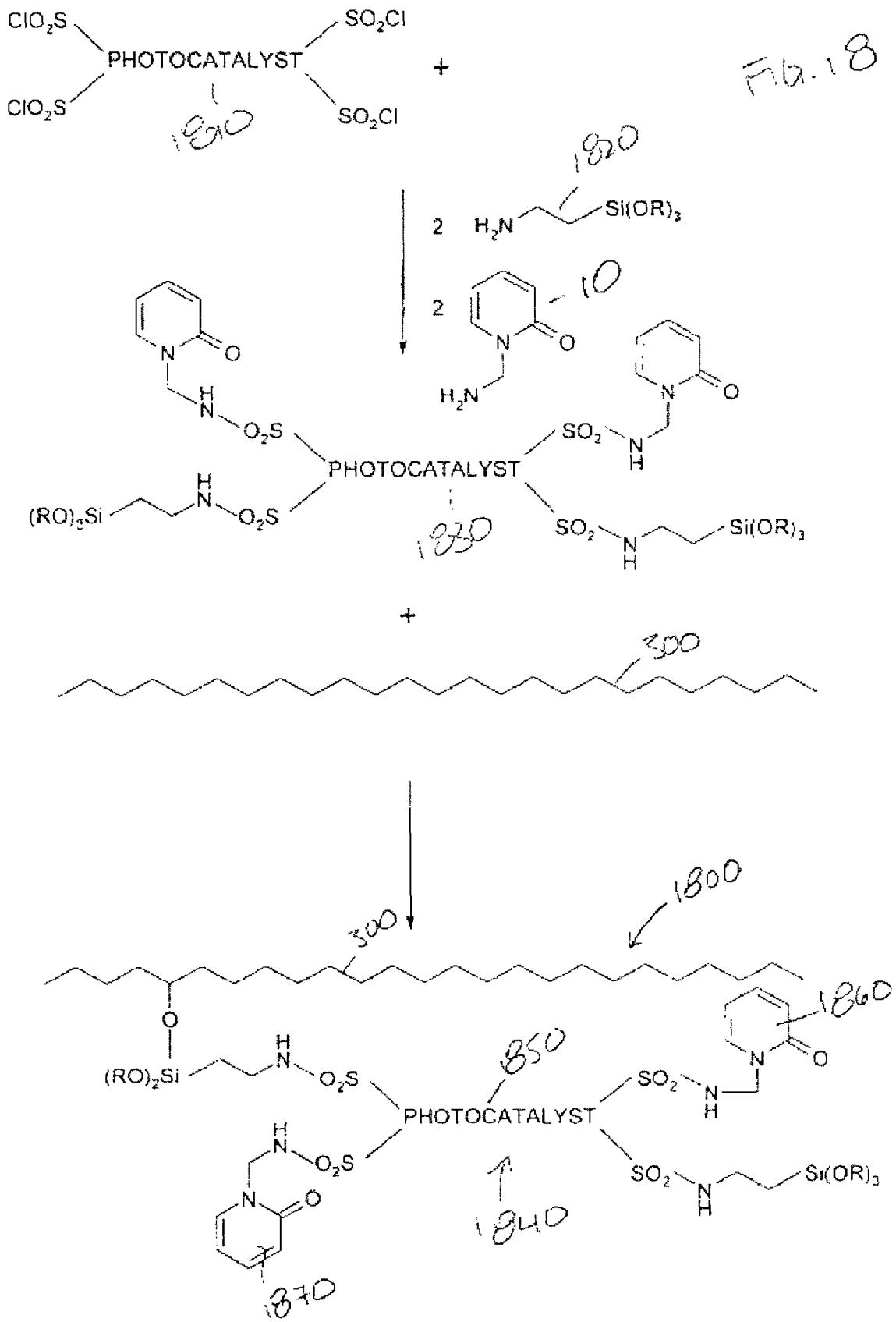
FIG. 18 summarizes the steps of a reaction scheme to form a polymer comprising a pendent substituted photocatalyst in combination with two singlet oxygen traps, wherein the photocatalyst is selected from the group consisting of a phthalocyanine and a porphyrin.

Referring now to FIG. 18, tetra-chlorosulfonated photocatalyst 1810 is reacted with 2 equivalents of gamma-aminopropyltrialkoxysilane 1820 and 2 equivalents of amino-substituted pyridone 10 to form di-siloxy-di-pyridone-substituted photocatalyst 1830. In certain embodiments, di-siloxy-di-pyridone-substituted photocatalyst 1830 comprises a substituted phthalocyanine. In certain embodiments, di-siloxy-di-pyridone-substituted photocatalyst 1830 comprises a substituted porphyrin. In certain embodiments, gamma-aminopropyltrialkoxysilane 1820 comprises gamma-aminopropyltrimethoxysilane. In certain embodiments, gamma-aminopropyltrialkoxysilane 1820 comprises gamma-aminopropyltriethoxysilane. Di-siloxy-di-pyridone-substituted photocatalyst 1830 is reacted with polymer 300 to form polymer 1800 which comprises a pendent group 1840 comprising a photocatalyst selected from the group consisting of a substituted phthalocyanine and a substituted porphyrin in combination with singlet oxygen trap pyridone 1860 and singlet oxygen trap pyridone 1870.

As those skilled in the art will appreciate, adjusting the equivalents of pyridone 10, and amino-siloxane 1820 used, the reaction scheme of FIG. 18 can be modified to form a polymer 1800 comprising a pendent group which comprises photocatalyst 1850 in combination with a one pyridone singlet oxygen trap or with three pyridone singlet oxygen traps.

Referring now to FIG. 6B, in certain embodiments pathogen-resistant coating 605 comprises a plurality of polymers 600. In certain embodiments, Applicant's pathogen-resistant coating 605 comprises a first plurality of polymers 600 and a second plurality of polymers 600, wherein each of the first plurality of polymers 600 comprise a photocatalyst 610 in combination with a singlet oxygen trap 650, and each of the second plurality of polymers 600 comprise a photocatalyst 620 in combination with a singlet oxygen trap 660. In certain embodiments, Applicant's pathogen-resistant coating 605 further comprises a third plurality of polymers 600 and a fourth plurality of polymers 600, wherein each of the third plurality of polymers 600 comprise a photocatalyst 630 in combination with a singlet oxygen trap 670, and each of the fourth plurality of polymers 600 comprise a photocatalyst 640 in combination with a singlet oxygen trap 680.

Figure 7:
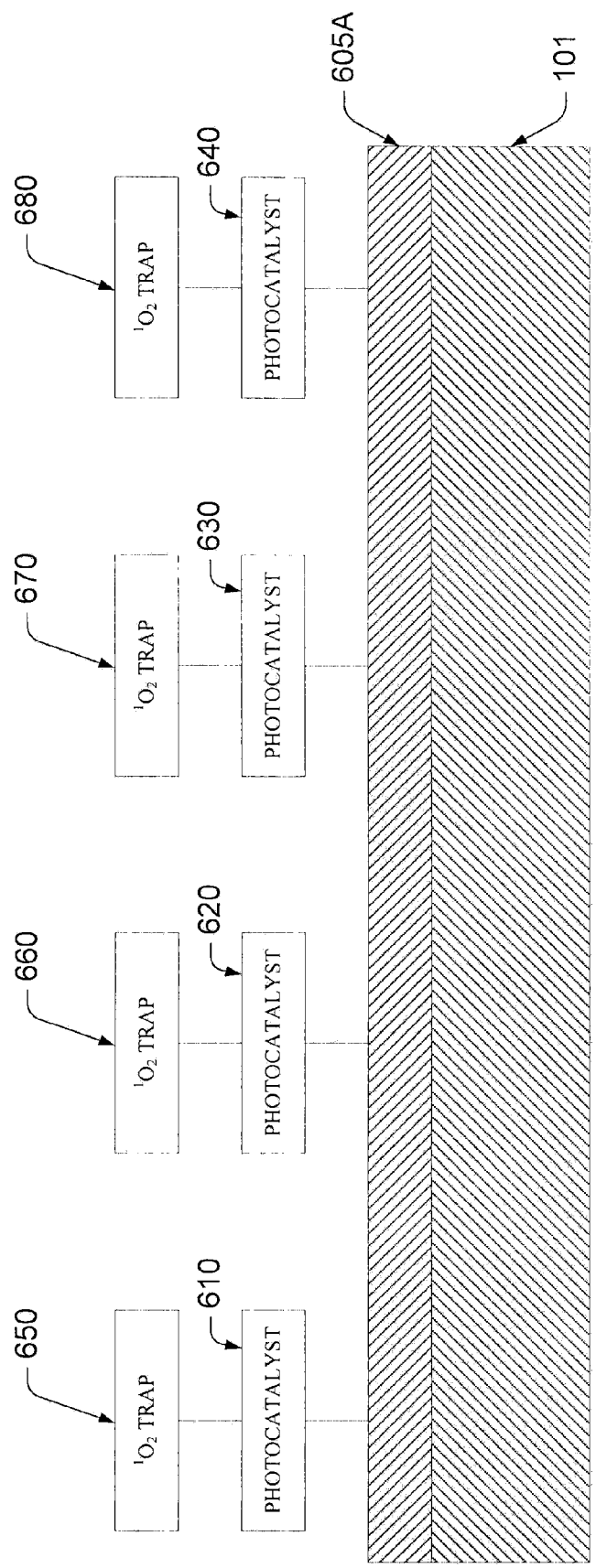
FIG. 7 is a block diagram showing a first embodiment of the pathogen-resistant coating of FIG. 6B disposed on one surface of a substrate.

FIG. 7 illustrates pathogen-resistant coating 605A disposed on a first surface of substrate 101. In certain embodiments, Applicant's pathogen-resistant coating 605A comprises a first plurality of polymers 600 and a second plurality of polymers 600, wherein each of the first plurality of polymers 600 comprise a photocatalyst 610 in combination with a singlet oxygen trap 650, and each of the second plurality of polymers 600 comprise a photocatalyst 620 in combination with a singlet oxygen trap 660. In certain embodiments, Applicant's pathogen-resistant coating 605A further comprises a third plurality of polymers 600 and a fourth plurality of polymers 600, wherein each of the third plurality of polymers 600 comprise a photocatalyst 630 in combination with a singlet oxygen trap 670, and each of the fourth plurality of polymers 600 comprise a photocatalyst 640 in combination with a singlet oxygen trap 680.

FIG. 8 illustrates pathogen-resistant coating 605A disposed on a first surface of substrate 101, and pathogen-resistant coating 605B disposed on a second surface of substrate 101. In certain embodiments, Applicant's pathogen-resistant coating 605A comprises a first plurality of polymers 600 and a second plurality of polymers 600, wherein each of the first plurality of polymers 600 comprise a photocatalyst 610 in combination with a singlet oxygen trap 650, and each of the second plurality of polymers 600 comprise a photocatalyst 620 in combination with a singlet oxygen trap 660. In certain embodiments, Applicant's pathogen-resistant coating 605A further comprises a third plurality of polymers 600 and a fourth plurality of polymers 600, wherein each of the third plurality of polymers 600 comprise a photocatalyst 630 in combination with a singlet oxygen trap 670, and each of the fourth plurality of polymers 600 comprise a photocatalyst 640 in combination with a singlet oxygen trap 680.

In certain embodiments, Applicant's pathogen-resistant coating 605B comprises a first plurality of polymers 600 and a second plurality of polymers 600, wherein each of the first plurality of polymers 600 comprise a photocatalyst 810 in combination with a singlet oxygen trap 820, and each of the second plurality of polymers 600 comprise a photocatalyst 830 in combination with a singlet oxygen trap 840. In certain embodiments, Applicant's pathogen-resistant coating 605B further comprises a third plurality of polymers 600 and a fourth plurality of polymers 600, wherein each of the third plurality of polymers 600 comprise a photocatalyst 850 in combination with a singlet oxygen trap 860, and each of the fourth plurality of polymers 600 comprise a photocatalyst 870 in combination with a singlet oxygen trap 880.

Figure 9A:
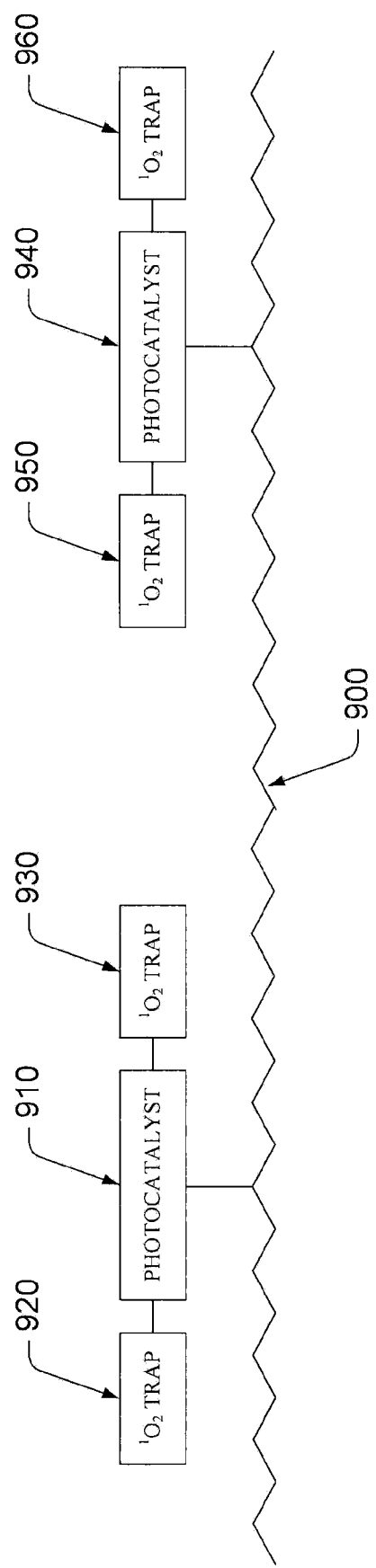
FIG. 9A is a block diagram showing a polymer chain comprising a plurality of photocatalyst moieties chemically bonded thereto, wherein two singlet oxygen traps are chemically attached to each photocatalyst moiety.

Referring now to FIG. 9A, in certain embodiments Applicant's pathogen-resistant coating comprises polymer 900, wherein polymer 900 comprises a plurality of photocatalysts chemically bonded to thereto in combination with a plurality of singlet oxygen traps chemically bonded thereto.

In certain embodiments, polymer 900 comprises for example and without limitation polyvinyl alcohol, polystyrene, polyolefins (such as polyethylene, polypropylene), cellulose, polyacrylates, polyalkykacrylates, polycarbonate, polyvinylchloride, polyurethane, siloxane, a cellulosic material (such as cellulose acetate, cellulose acetate butyrate, cellulose nitrate and rayon), polyamides (such as nylon homopolymers and copolymers, including Nylon 6, Nylon 6,6 Nylon 11 and Nylon 12, Kevlar, Nomex and related aromatic polyamides, and silk), polyacrylonitrile, polyester, and the like, and combinations thereof.

In the illustrated embodiment of FIG. 9A, polymer 900 comprises photocatalysts 910 and 940 chemically bonded thereto. Further in the illustrated embodiment of FIG. 9A, singlet oxygen traps 920 and 930 are disposed in pendent groups attached to photocatalyst 910, and singlet oxygen traps 950 and 960 are disposed in pendent groups attached to photocatalyst 940.

Figure 9B:
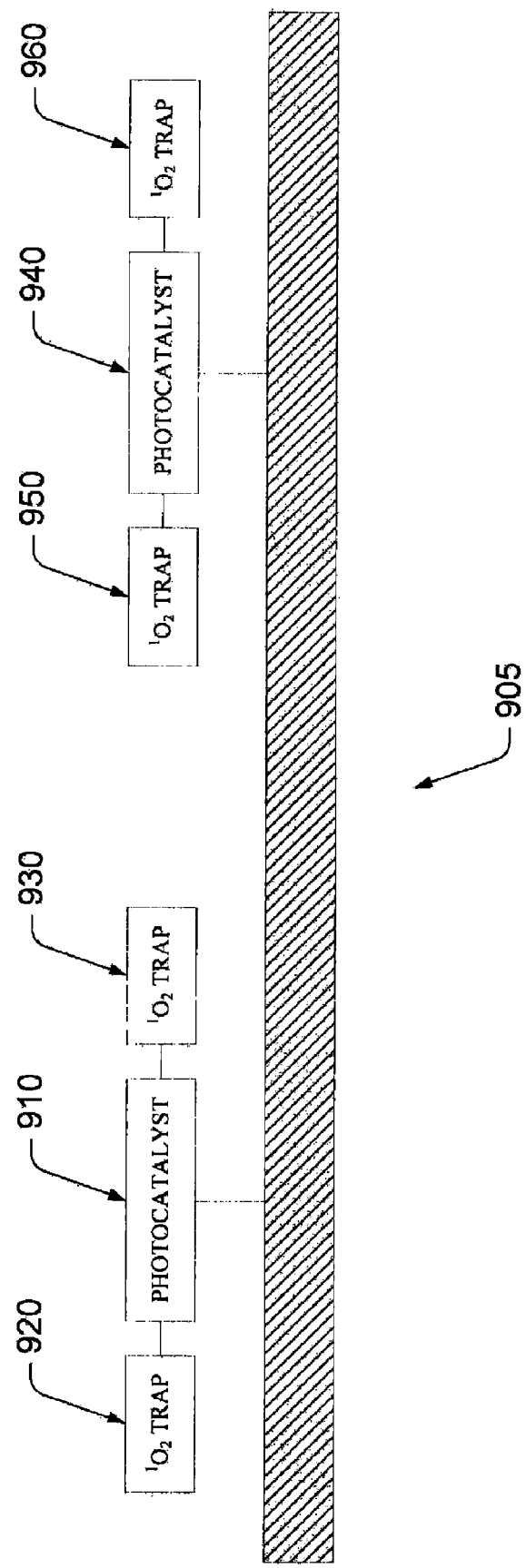
FIG. 9B is a block diagram showing Applicant's pathogen-resistant coating comprising a plurality of the polymers of FIG. 9A.

Referring now to FIG. 9B, in certain embodiments pathogen-resistant coating 905 comprises a plurality of polymers 900. In certain embodiments, Applicant's pathogen-resistant coating 905 comprises a first plurality of polymers 900 and a second plurality of polymers 900, wherein each of the first plurality of polymers 900 comprise a photocatalyst 910 in combination with singlet oxygen traps 920 and 930, and each of the second plurality of polymers 900 comprise a photocatalyst 940 in combination with singlet oxygen traps 950 and 960.

Figure 10:
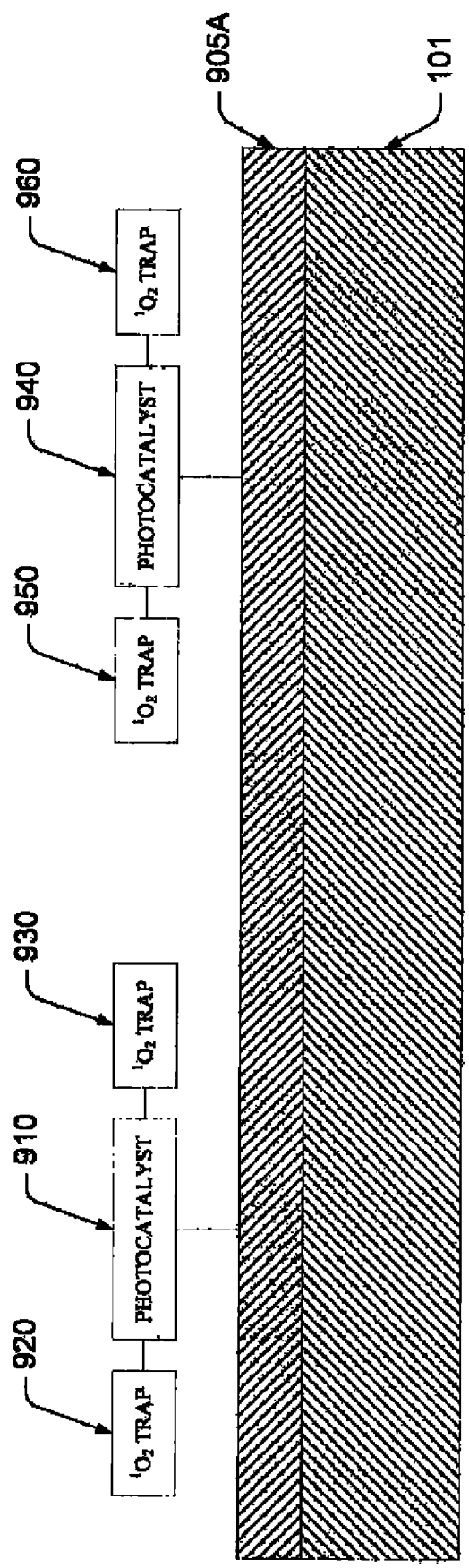
FIG. 10 is a block diagram showing a first embodiment of the pathogen-resistant coating of FIG. 9B disposed on one surface of a substrate.

FIG. 10 illustrates pathogen-resistant coating 905A disposed on a first surface of substrate 101. In certain embodiments, Applicant's pathogen-resistant coating 905A comprises a first plurality of polymers 900 and a second plurality of polymers 900, wherein each of the first plurality of polymers 900 comprise a photocatalyst 910 in combination with singlet oxygen traps 920 and 930, and each of the second plurality of polymers 900 comprise a photocatalyst 940 in combination with singlet oxygen traps 950 and 960.

FIG. 11 illustrates pathogen-resistant coating 905A disposed on a first surface of substrate 101, and pathogen-resistant coating 905B disposed on a second surface of substrate 101. In certain embodiments, Applicant's pathogen-resistant coating 905A comprises a first plurality of polymers 900 and a second plurality of polymers 900, wherein each of the first plurality of polymers 900 comprise a photocatalyst 910 in combination with singlet oxygen traps 920 and 930, and each of the second plurality of polymers 900 comprise a photocatalyst 940 in combination with singlet oxygen traps 950 and 960. In certain embodiments, Applicant's pathogen-resistant coating 905B comprises a first plurality of polymers 900 and a second plurality of polymers 900, wherein each of the first plurality of polymers 900 comprise a photocatalyst 1110 in combination with singlet oxygen traps 1120 and 1130, and each of the second plurality of polymers 900 comprise a photocatalyst 1140 in combination with singlet oxygen traps 1150 and 1160.

While the preferred embodiments of the present invention have been illustrated in detail, it should be apparent that modifications and adaptations to those embodiments may occur to one skilled in the art without departing from the scope of the present invention as set forth in the following claims.

I claim:

1. A pathogen-resistant fabric, comprising:
   a polymeric material selected from the group consisting of polystyrene, polyolefin, polyacrylate, polyalkykacrylate, polycarbonate, polyvinylchloride, polyamide, polyacrylonitrile, and polyester;
   a phthalocyanine photocatalyst chemically bonded to said polymeric material; and
   a singlet oxygen trap molecule chemically bonded to said photocatalyst, wherein said singlet oxygen trap reacts with singlet oxygen produced by said photocatalyst.

2. The pathogen-resistant fabric of claim 1, further comprising:
   two singlet oxygen trap molecules chemically bonded to said photocatalyst, wherein said two or more oxygen trap molecules react with singlet oxygen produced by said photocatalyst.

3. The pathogen-resistant fabric of claim 2, wherein:
   said two singlet oxygen trap molecules comprise a first singlet oxygen trap molecule comprising a first structure and a second singlet oxygen trap molecule comprising a second structure; and
   said first structure differs from said second structure.

4. The pathogen-resistant fabric of claim 1, further comprising:
   four oxygen trap molecules chemically bonded to said photocatalyst, wherein said four oxygen trap molecules react with singlet oxygen produced by said photocatalyst.

5. A pathogen-resistant fabric, comprising:
   a polymeric material selected from the group consisting of polystyrene, polyolefin, polyacrylate, polyalkykacrylate, polycarbonate, polyvinylchloride, polyamide, polyacrylonitrile, and polyester;
   a phthalocyanine photocatalyst chemically bonded to said polymeric material; and
   a singlet oxygen trap molecule chemically bonded to said polymeric material, wherein said singlet oxygen trap reacts with singlet oxygen produced by said photocatalyst.

* * * * *